US012784545B2

(12) United States Patent
Berlec et al.

(10) Patent No.: US 12,784,545 B2
(45) Date of Patent: Nov. 3, 2026

(54) ROULETTE GAME AND SIDE BETS WITH DOUBLE ROULETTE WHEELS

(71) Applicant: INTERBLOCK D.O.O., Menges (SI)

(72) Inventors: Simon Berlec, Kamnik (SI); Tomaz Fink, Kamnik (SI); John Joseph Connelly, Las Vegas, NV (US); Kevin D. Parker, North Las Vegas, NV (US)

(73) Assignee: INTERBLOCK D.O.O., Las Vegas, NV (US)

( * ) Notice: Subject to any disclaimer, the term of this patent is extended or adjusted under 35 U.S.C. 154(b) by 205 days.

(21) Appl. No.: 18/639,836

(22) Filed: Apr. 18, 2024

(65) Prior Publication Data

US 2024/0265784 A1 Aug. 8, 2024

Related U.S. Application Data

(63) Continuation of application No. 17/064,455, filed on Oct. 6, 2020, now abandoned.

(60) Provisional application No. 62/914,322, filed on Oct. 11, 2019.

(51) Int. Cl.
*G07F 17/32* (2006.01)
*A63F 5/00* (2006.01)

(52) U.S. Cl.
CPC ........ *G07F 17/3288* (2013.01); *A63F 5/0005* (2013.01); *A63F 5/0011* (2013.01); *A63F 5/0058* (2013.01); *A63F 5/0088* (2013.01); *A63F 5/0094* (2013.01); *G07F 17/3211* (2013.01); *G07F 17/322* (2013.01); *G07F 17/3244* (2013.01); *G07F 17/3269* (2013.01); *G07F 17/323* (2013.01)

(58) Field of Classification Search
CPC ............. G07F 17/3269; G07F 17/3244; G07F 17/322; G07F 17/3211; G07F 17/3288; A63F 5/0005; A63F 5/0058; A63F 5/0094
See application file for complete search history.

(56) References Cited

U.S. PATENT DOCUMENTS

| | | | |
|---|---|---|---|
| 6,561,512 | B2 | 5/2003 | Luciano et al. |
| 6,921,072 | B2 | 7/2005 | Hughes-Watts |
| 7,553,233 | B2 | 6/2009 | Jarvis et al. |

(Continued)

FOREIGN PATENT DOCUMENTS

| | | | |
|---|---|---|---|
| WO | WO 2013/128162 | A1 | 9/2013 |

OTHER PUBLICATIONS

International Patent Application No. PCT/US2018/054757; Int'l Search Report and the Written Opinion; dated Dec. 27, 2018; 15 pages.

*Primary Examiner* — Thomas H Henry
(74) *Attorney, Agent, or Firm* — BakerHostetler

(57) ABSTRACT

A roulette system including two roulette machines. Standard roulette bets may be placed by a player on a first roulette machine and if no side bet is placed, only the first machine is operated. When a side bet is placed, a second roulette machine is operated in parallel with the first machine. Side bets may be based on various combinations of results from each machine, or an aggregate total of the result of both machines, and other proposition type bets. Inertial values associated with the balls of each machine may be monitored and used to adjust ball launch times, ball launch speeds, rotation velocity of roulette wheels of the machines and the braking of the roulette wheels so the machines operate in parallel.

20 Claims, 16 Drawing Sheets

(56) References Cited

U.S. PATENT DOCUMENTS

| | | | |
|---|---|---|---|
| 9,327,186 | B1 | 5/2016 | Pececnik |
| 2006/0066044 | A1 | 3/2006 | Dabosh |
| 2008/0009334 | A1 | 1/2008 | Walker et al. |
| 2008/0076507 | A1 | 3/2008 | Wertheimer |
| 2008/0139279 | A1 | 6/2008 | Okada |
| 2012/0088565 | A1 | 4/2012 | Miller |
| 2012/0153571 | A1 | 6/2012 | Smith et al. |
| 2012/0238343 | A1 | 9/2012 | Perrone et al. |
| 2015/0154823 | A1 | 6/2015 | Barclay et al. |
| 2016/0328905 | A1 | 11/2016 | Kohl et al. |
| 2017/0087450 | A1 | 3/2017 | Mercer et al. |
| 2017/0092037 | A1 | 3/2017 | Snow et al. |
| 2017/0109974 | A1 | 4/2017 | Witty et al. |
| 2017/0256121 | A1 | 9/2017 | Burgstaller et al. |
| 2019/0108715 | A1* | 4/2019 | Bergant ................ A63F 5/0058 |
| 2019/0108724 | A1 | 4/2019 | Bergant et al. |
| 2019/0108725 | A1 | 4/2019 | Krupenko |
| 2019/0244469 | A1 | 8/2019 | Grubmueller |

* cited by examiner

ROULETTE GAME AND SIDE BETS WITH DOUBLE ROULETTE WHEELS

CROSS REFERENCE TO RELATED APPLICATION

This application is a continuation of U.S. patent application Ser. No. 17/064,455, filed Oct. 6, 2020, which claims benefit under 35 U.S.C. § 119(e) of Provisional U.S. patent Application No. 62/914,322, filed Oct. 11, 2019, the contents of which is incorporated herein by reference in its entirety.

BACKGROUND INFORMATION

Roulette is a popular wagering game played in casinos and other gaming establishments. In mechanical versions of the game (versus video generated), a roulette ball is launched into an angled annular track encircling a spinning roulette wheel. The roulette ball continues to rotate around the annular track in an opposite direction of the spinning roulette wheel creating friction between the roulette ball and the annular track. The friction created between the roulette ball and the annular track causes the ball to lose momentum. Upon losing sufficient momentum, the roulette ball exits the annular track and follows a spiraling path towards the roulette wheel.

As it follows the spiraling path, the roulette ball may engage with one or more of the ball stops (or canoes) intervening between the annular track and the roulette wheel, causing the ball to jump about. Eventually the roulette ball comes to rest in one of the numerous equally-spaced ball slots located along a circumference of the roulette wheel. Each ball slot among the equally-spaced ball slots is isolated from adjacent ball slots by separators positioned radially outward and corresponds to a particular number and color. The particular number represents a result for the game cycle that began when the roulette ball was launched.

As the roulette ball comes to rest, a marker (or dolly) is placed on an area of a felt betting area (or layout) identifying the particular number and color corresponding to the ball slot in which the roulette ball came to rest. Winning and losing bets for that game cycle to be placed on the felt betting area are then determined according to the result. Once the losing bets are collected and the winning bets are paid, a new game cycle starts.

In addition to causing the roulette ball to lose momentum, the friction between the roulette ball and the annular track may also erode some material from the annular track. That material eroded from the annular track and/or the ball becomes dust within the roulette wheel and the annular track. Another opportunity for the creation and dispersion of dust arises any time the roulette ball engages with a ball stop. As subsequent balls are launched into the angled track, interaction between the dust and subsequent roulette balls may impact a later game cycle.

For example, randomization of the later game cycle's result may be reduced by interaction with the dust. Also, subsequent roulette balls may rotate slower around the annular track, which increases game cycle times and further reduces randomization. At some point, dust generated by the friction renders the roulette table aesthetically displeasing, which negatively impacts the players' experience. The dust may also slow down game play cycles, thereby making the roulette table less productive. Furthermore, removing the dust creates maintenance downtime during which the roulette table is unavailable for gameplay.

Roulette bets can be placed on any single number (i.e., "straight up") from 1-36, on "0" or "00" (some tables only use "0"), on a "row" (0 and 00), on "red/black" (all red or black numbers and excluding 0 and 00), on "even/odd" (all even or odd numbers and excluding 0 and 00), on "low/high" numbers 1-18 or numbers 19-36, on a "dozen" or a "third" (1-12, 13-24 or 25-36, on a "column" (all numbers in one of three columns when the table is viewed from its end), on a "top line" or a "basket" (0, 00, 1, 2 and 3), on a "six line" (any six numbers from two horizontal rows), on a "split" (any two adjoining numbers vertical or horizontal), on a "street" (any three numbers horizontal, such as 1, 2, 3 or 4, 5, 6, etc.), and on a "corner" (any four adjoining numbers in a block, such as 1, 2, 4, 5 or 17, 18, 20, 21, etc.). With all of the bets that are possible, attractive side bets that encourage more game play can be difficult to implement.

TECHNICAL FIELD

The present disclosure relates generally, but not exclusively, to the field of gaming, particularly roulette gaming.

SUMMARY

An embodiment is directed to a roulette system configured to operate two unattended live roulette games in which a first roulette ball is launched into an angled annular track encircling a first roulette wheel of a first game and a second roulette ball is simultaneously launched into an angled annular track encircling a second roulette wheel of a second game. Standard roulette bets may be placed by a player for a first game cycle of roulette on a first roulette machine. When only the standard bet is placed only the first roulette machine is operated. When a side bet is placed, the second roulette machine is operated. The two roulette machines are then operated in parallel. Side bets may be based on various combinations of results from each machine, or an aggregate total of the result of both machines, and other proposition type bets. In some embodiments, a controller associated with the roulette machine regulates one or more inertial values associated with the roulette ball. In some embodiments, a bet close time of a betting window associated with the live roulette games is determined based on one or more inertial values associated with the roulette ball. In some embodiments, a rotation velocity of the roulette wheel is adjusted subsequent to a bet close time of a betting window associated with the live roulette games. In some embodiments, game cycle events are detected using audio associated with the live roulette games. In these embodiments, audio audible and/or visual special effects are generated based on the audio. In some embodiments, a controller associated with the roulette machine synchronizes the live roulette games operated by the roulette machine with live roulette games operated by one or more additional roulette machines.

These and other features will be more clearly understood from the following detailed description taken in conjunction with the accompanying drawings and claims. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EMBODIMENTS

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Disclosed herein are methods, systems, and computer readable storage media that provide for increased randomization of roulette results and improved guest satisfaction. Some embodiments of the present invention are described herein in terms of an automated roulette wagering system for illustrative purposes. However, embodiments of the present invention are not limited to an automated roulette wagering system, but rather may be implemented in various wagering systems-both automated and manual—that provide similar functionalities as an automated roulette wagering system.

Figure 1:
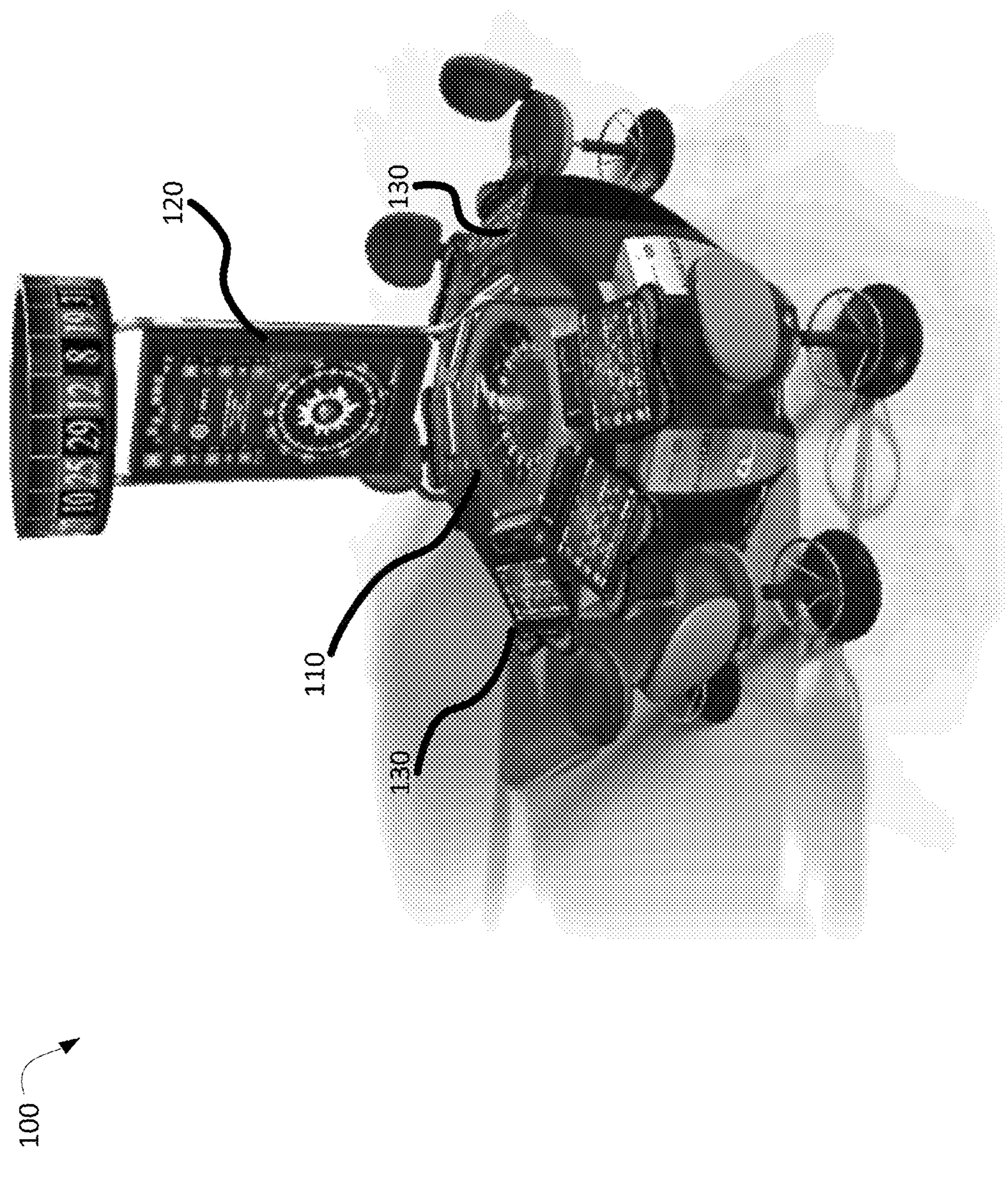
FIG. 1 is a diagrammatic, elevated view of a roulette wagering system in accordance with an embodiment.

FIG. 1 illustrates an automated roulette wagering system 100 in accordance with an embodiment of the present disclosure. As shown by FIG. 1, automated roulette wagering system 100 includes roulette machine 110, central display 120, and a plurality of play stations 130. While six play stations 130 are illustrated in the embodiment depicted by FIG. 1, one skilled in the art will recognize that roulette wagering system 100 may include any number of play stations associated with roulette machine 110. Likewise, there may be more than one roulette machine as further described herein.

For example, roulette wagering system 100 may include one play station, two play stations, ten play stations, and so on. In an embodiment, roulette wagering system 100 may not include any play stations 130. For example, roulette wagering system 100 may be servicing one or more remote clients not physically proximate to roulette wagering system 100. That is, roulette machine 110 of roulette wagering system 100 may be an unattended live table game of chance providing game cycle results to one or more play stations physically remote from roulette machine 110. In an embodiment, roulette wagering system 100 may be servicing a combination of local play stations (e.g., play stations 130) and remote play stations.

In an embodiment, roulette wagering system 100 is located at a first geographic location and is providing game cycle results to remote clients physically located at one or more remote geographic locations that are not physically proximate to the first geographic location. For example, roulette wagering system 100 may be located in a warehouse and provide game cycle results to remote clients located in a casino located a few miles away from the warehouse. As another example, roulette wagering system 100 may be located in a first casino and provide game cycle results to remote clients located in a second casino or gaming establishment. The first casino and the second casino or gaming establishment may be located in a different city, state, country, etc.

Roulette machine 110 is configured to operate unattended live roulette games in which a physical roulette ball is launched into an angled annular track encircling a roulette wheel. In an embodiment, roulette machine 110 may be configured to operate any known live table game of chance. Each live roulette game operated by roulette machine 110 is composed of a game cycle. The game cycle of the live roulette game begins as a roulette ball is positioned to be launched into the annular track. The roulette ball is launched into the annular track and rotates around the annular track a plurality of times. In an embodiment, the roulette ball is rotated around the annular track in a first direction and the roulette wheel is spinning about a central axis in a second direction opposing the first direction. Friction between the roulette ball and the annular track reduces a momentum of the roulette ball until gravity causes the roulette ball to exit the annular track.

Upon exiting the annular track, the roulette ball follows a path towards the center of the roulette wheel along a downward slope intervening between the annular track and the roulette wheel. As the roulette ball follows the path towards the center of the roulette wheel, the roulette ball may interact with one or more ball stops positioned about the downward slope. When the roulette ball encounters the roulette wheel, the roulette ball bounces a plurality of times and then settles into one of a plurality of ball slots positioned around an outer circumference of the roulette wheel. The game cycle concludes as the roulette ball settles in one of the plurality of ball slots. A game cycle result is determined based on a number and possibly also a color corresponding to the particular ball slot in which the roulette ball settled.

Each live roulette game operated by roulette machine 110 is also composed of a betting window associated with the game cycle. The betting window includes a bet open time and a bet close time. The bet open time represents a point in time in which the betting window transitions from a closed state to an open state. After the bet open time, the betting window is in the open state and a player is allowed to place one or more bets or wagers on the associated game cycle. In an embodiment, the player is allowed to place one or more side bets or wagers on at least one additional game of chance when the betting window is in the open state.

The bet close time represents a point in time in which the betting window transitions from an open state to a closed state. After the bet close time, the betting window is in the closed state and the player is no longer allowed to place bets or wagers on the associated game cycle. In an embodiment, the bet close time precedes a time that the roulette ball settles in one of the plurality of ball slots. In an embodiment, the bet close time precedes a time that the roulette ball exits the annular track. In an embodiment, the bet close time is adjustable based on an inertial value associated with the roulette ball.

In operation, roulette machine 110 utilizes one or more random number generators to control various mechanical aspects of the live roulette games. The one or more random number generators are used to increase a randomization of events composing the live roulette games. Increasing the randomization of events composing the live roulette games reduces a likelihood that game cycle results are predictable. For example, random number generators may dictate a velocity that a roulette ball is launched into the angled annular track, a number of times that a roulette ball rotates around the angular track, a direction the roulette ball spins while rotating around the angular track, a timing of various events composing the live roulette games, and the like.

Central display 120 is configured to present players and other guests of the casino or other gaming establishment with information associated with the live roulette games operated by roulette machine 110. Such information may be presented in a visual format, an auditory format, or a combination thereof. The information presented by central display 120 may include information regarding individual results of previous game cycles, a state of a current betting window associated with roulette machine 110, statistics about previous games cycles, an operating condition of roulette machine 110, a progressive jackpot associated with roulette machine 110, and the like. In an embodiment, central display 120 is further configured to present players and other guests of the casino or other gaming establishment with advertising media.

Each play station among the plurality of play stations 130 is generally configured to enable a player to participate in the live roulette games operated by roulette machine 110. In an embodiment, each play station among the plurality of play stations 130 is further configured to enable the player to participate in at least one additional game of chance. In an embodiment, the at least one game of chance is operated by a gaming device other than roulette machine 110. For example, a play station 130 may enable the player to fund a credit balance for placing bets, place bets on games of chance (e.g., the live roulette game operated by roulette machine 110), receive winnings associated with bets placed on games of chance, and the like. In an embodiment, a play station may enable the player to interact with an object associated with a game of chance. Examples of such objects include dice, a ball, a wheel, and the like.

Figure 2:
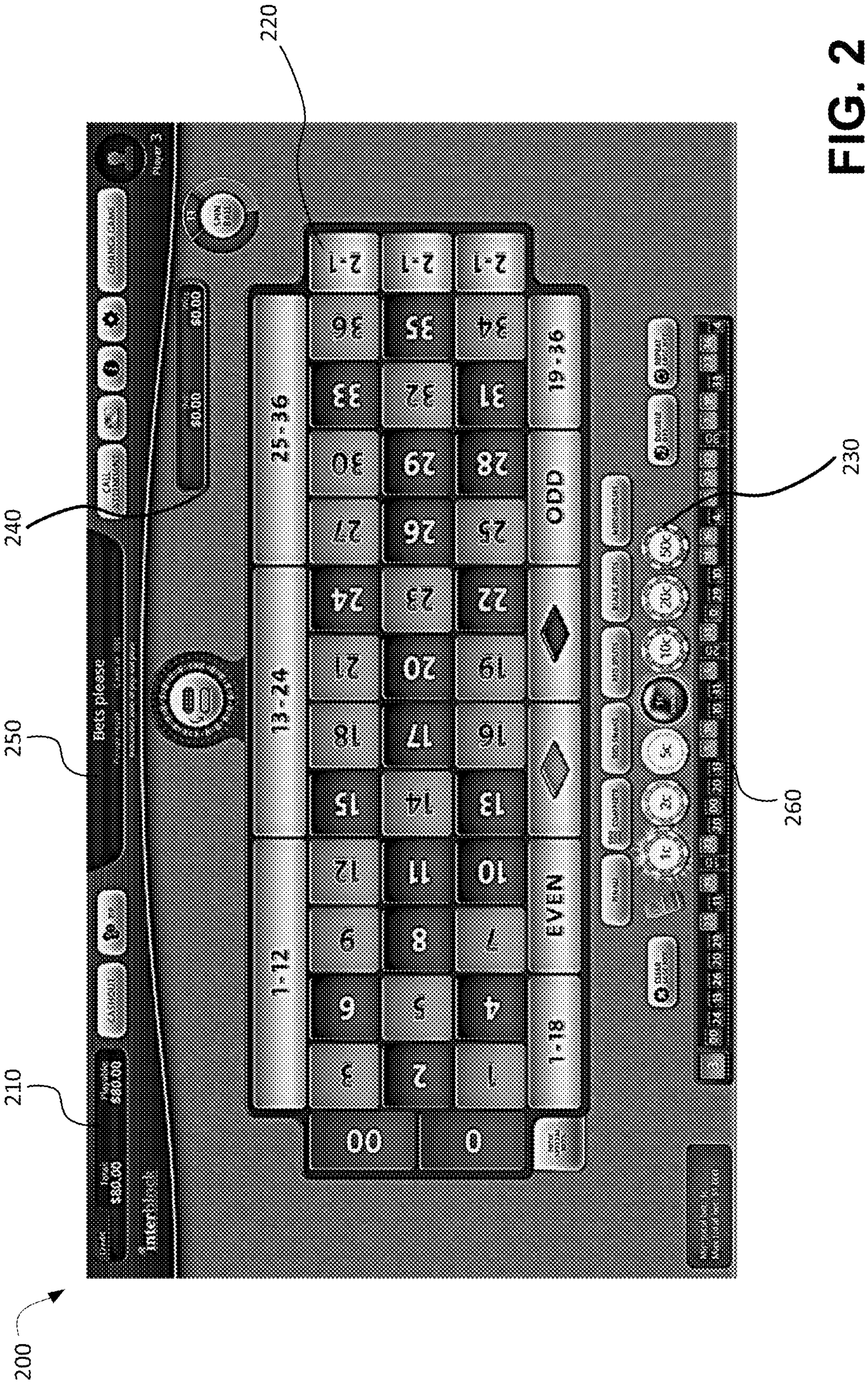
FIG. 2 illustrates an example graphical user interface ("GUI") displayed by a play station, in accordance with an embodiment.

As best seen in FIG. 2, play station 130 may present a graphical user interface ("GUI") 200 that enables a player to participate in the live roulette games operated by roulette machine 110. For example, GUI 200 may display account information 210 to a player that represents a maximum credit balance that is available to the player for wagering on the live roulette games. In an embodiment, a player may insert currency, tickets, tokens, and the like into play station 130 in order to increase the maximum credit balance. In an embodiment, a player may electronically transfer funds from another account using play station 130 in order to increase the maximum credit balance.

GUI 200 may also display an electronic representation of a felt betting area 220 (or layout) for live roulette games operated by roulette machine 110. The player may wager on the live roulette games by placing one or more virtual chips 230 onto the felt betting area 220. For example, the player may place virtual chips 230 onto an area of felt betting area 220 that identifies a particular ball slot in which the player believes a roulette ball will come to rest within a particular game cycle. As another example, the player may place virtual chips 230 onto an area of felt betting area 220 that identifies a particular range of ball slots in which the player believes a roulette ball will come to rest. The player may also place virtual chips 230 onto felt betting area 220 to bet that during a particular game cycle a roulette ball will come to rest in a ball slot associated with a particular color (e.g., red or black). As another example, the player may also place virtual chips 230 onto felt betting area 220 to bet that a roulette ball will come to rest in a ball slot associated with an odd or even number.

A wagering update area 240 of GUI 200 may also present information regarding an amount currently wagered by the player on the live roulette games operated by roulette machine 110. Information regarding a payout amount won by the player through previous bets may also be presented to the player in wagering update area 240. In an embodiment, wagering update area 240 may also present the player with information regarding an aggregate amount wagered and/or won in a current session. In an embodiment, wagering update area 240 may also present the player with information regarding an aggregate amount wagered and/or won within a predetermined period of time (e.g., hour, day, month, year, lifetime, etc.).

GUI 200 may also present a status update area 250 that provides the player with information about a current game cycle of the live roulette games operated by roulette machine 110. For example, status update area 250 may inform the player that a betting window associated with the current game cycle is in an open state. The betting window is in the open state between a bet open time and a bet close time. As long as the betting window remains in the open state, the player is free to wager on the current game cycle of the live roulette games. The betting window associated with the current game cycle transitions from the open state to a closed state when the bet close time is reached. Status update area 250 may inform the player that a betting window associated with the current game cycle is in the closed state.

A historical data area 260 of GUI 200 may provide the player with information about results from previous game cycles of the live roulette games. For example, historical data area 260 may display a sequence of individual results from the previous game cycles. As another example, historical data area 260 may display statistical information about the previous game cycles. The statistical information may include a percentage of a predetermined number of previous game cycles in which the roulette ball came to rest in a particular color, a ball slot associated with an odd number, a particular range of ball slots, and the like.

Figure 3:
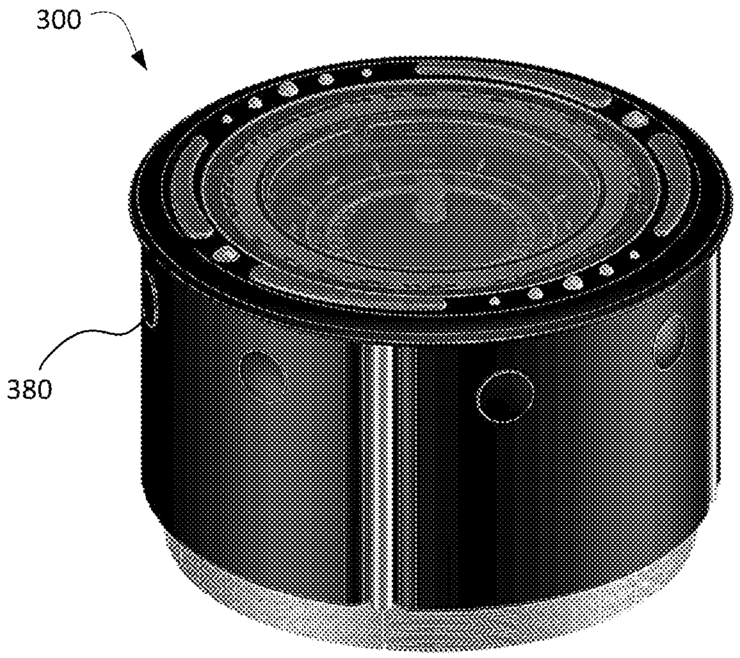
FIG. 3 is a diagrammatic, elevated view of a roulette machine in accordance with an embodiment.
Figure 4:
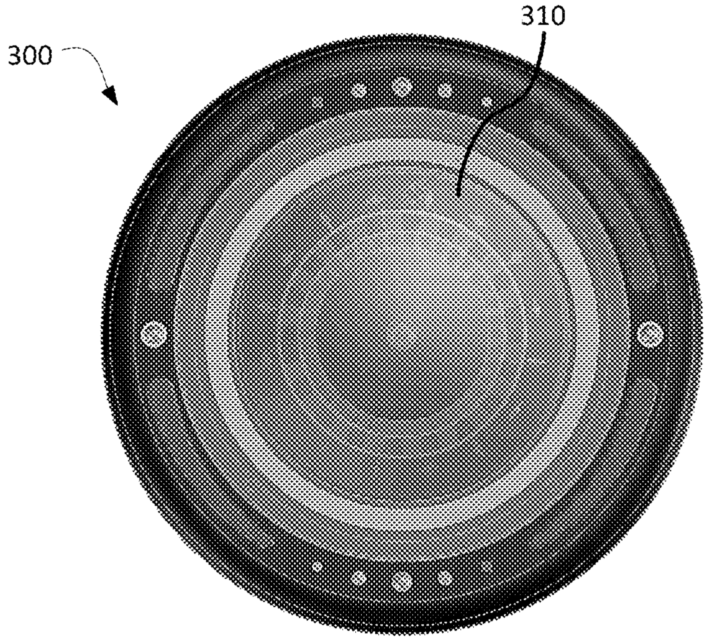
FIG. 4 is a top down view of the roulette machine depicted by FIG. 3, in accordance with an embodiment.
Figure 5:
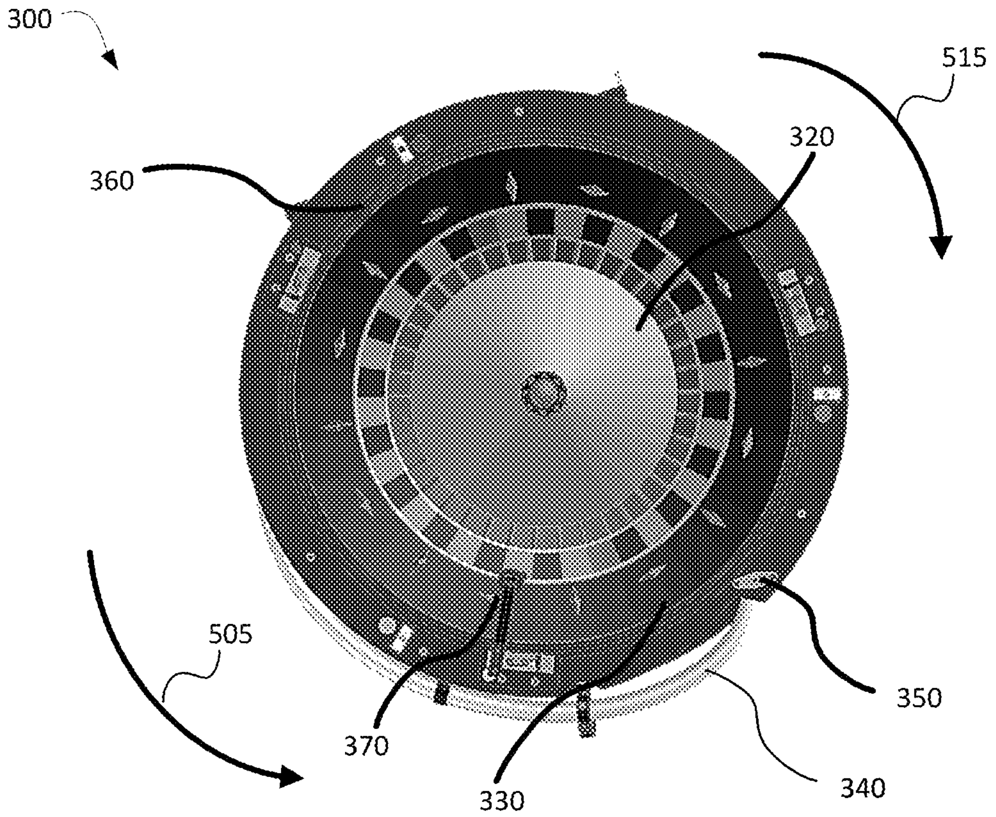
FIG. 5 is a view similar to FIG. 3, but with a transparent cover removed, in accordance with an embodiment.

FIGS. 3-5 illustrate a roulette machine 300 in accordance with an embodiment of the present disclosure. In an embodiment, roulette machine 300 may be used to implement roulette machine 110 of roulette wagering system 100 in FIG. 1. As best seen in FIG. 4, a transparent cover 310 (e.g., a glass dome) encases an underlying roulette wheel 320 such that aspects related game play remain visible. Transparent cover 310 may provide a physical means of isolating roulette wheel 320 from an environment surrounding roulette machine 300. By isolating roulette wheel 320, transparent cover 310 reduces the likelihood that game cycle results are impacted by influences present in the environment surrounding roulette machine 300. Examples of such influences include dealers, players, external dust, air flow, and the like.

Turning to FIG. 5, a top down view of roulette machine 300 is provided after transparent cover 310 has been removed. As shown by FIG. 5, roulette machine 300 includes roulette wheel 320, annular track 330, and ball launch tube 340. In operation, a roulette ball is launched from ball launch tube 340 into annular track 330 at launch point 350 as each game cycle commences. In the example depicted by FIG. 5, the roulette ball is launched in a direction represented by the arrow associated with designator 505. As the roulette ball rotates around roulette wheel 320, roulette wheel 320 is rotating in an opposing direction represented by the arrow associated with designator 515.

In an embodiment, roulette machine 300 further includes at least one inertial data sensor 360 associated with annular track 330, such as being incorporated into the annular track 330 in some manner. Inertial data sensor 360 is configured to obtain inertial information associated with a roulette ball launched into annular track 330. Examples of such inertial information include a velocity that the roulette ball is launched into annular track 330, deceleration of the roulette ball's velocity after being launched into annular track 330, and the like. The inertial information obtained by inertial data sensor 360 may be used to determine inertial-related information associated with the roulette ball subsequent to being launched into annular track 330, and the like. Such inertial-related information may include a number of time that the roulette ball rotates within angular track ("ball revolutions"), a direction the roulette ball spins while rotating around angular track 330, a velocity that the roulette ball spins while rotating around angular track 330, and the like.

In an embodiment, roulette machine 300 further includes at least one image sensor 370. The at least one image sensor 370 is configured to capture image data associated with particular game cycles of the live roulette games operated by roulette machine 300. Image sensor 370 may provide the captured image data to a controller associated with roulette machine 300 as a video stream, a sequence of individual image frames, raw image data, and the like. In an embodiment, a controller (in the form of a computer system, see FIG. 18) associated with roulette machine 300 may configure image sensor 370 by specifying a frame-rate, a resolution, a color value, a video stream encoding format, a subset of the image sensor's available pixels to activate and/or deactivate, and the like.

In an embodiment, image sensor 370 is configured to capture image data on a continuous basis. For example, the image data captured by image sensor 370 may provide a live video feed of the live roulette games operated by roulette machine 300. In an embodiment, image sensor 370 is configured to capture image data for a predefined period of a particular game cycle. For example, such predefined periods may be associated with a roulette ball being launched into annular track 330, a roulette ball coming to rest in a particular ball slot of roulette wheel 320, a betting window associated with a particular game cycle, and the like.

In an embodiment, image sensor 370 is configured to capture image data associated with a particular area of roulette wheel 320. Examples of the particular area include launch point 350, an arc portion of annular track 330, a predefined reference point of roulette wheel 320, a table stop position of roulette wheel 320, and the like.

In an embodiment, roulette machine 300 further includes one or more audio output devices 380 (e.g., speakers). As best seen in FIG. 3, the audio output devices 380 may position around an outer circumference of roulette machine 300. The audio output devices 380 may present audible announcements regarding events associated with roulette machine 300. The audible announcements may enable roulette machine 300 to better serve hearing impaired guests. Examples of such events include information about an operating state (e.g., down for maintenance) of roulette machine 300, information about a current game cycle (e.g., a betting window associated with the current game cycle is open), and the like. The audio output devices 380 may also provide background music, sound effects, and the like to players and other guests interacting with roulette machine 300.

Because the roulette wheel 320 is covered by transparent cover 310, it may not be possible for players to hear the ball as it spins and jumps around on the roulette wheel 320, which for some players changes a favored aspect of the game. Hence, the audio output devices 380 may play sounds that correspond to the movement of the ball as it launches, as it moves around the annular track 330, as it bounces around on the roulette wheel 320, and as it settles into a ball slot. Lighting may also be employed to help players follow the movement of the ball.

Figure 6:
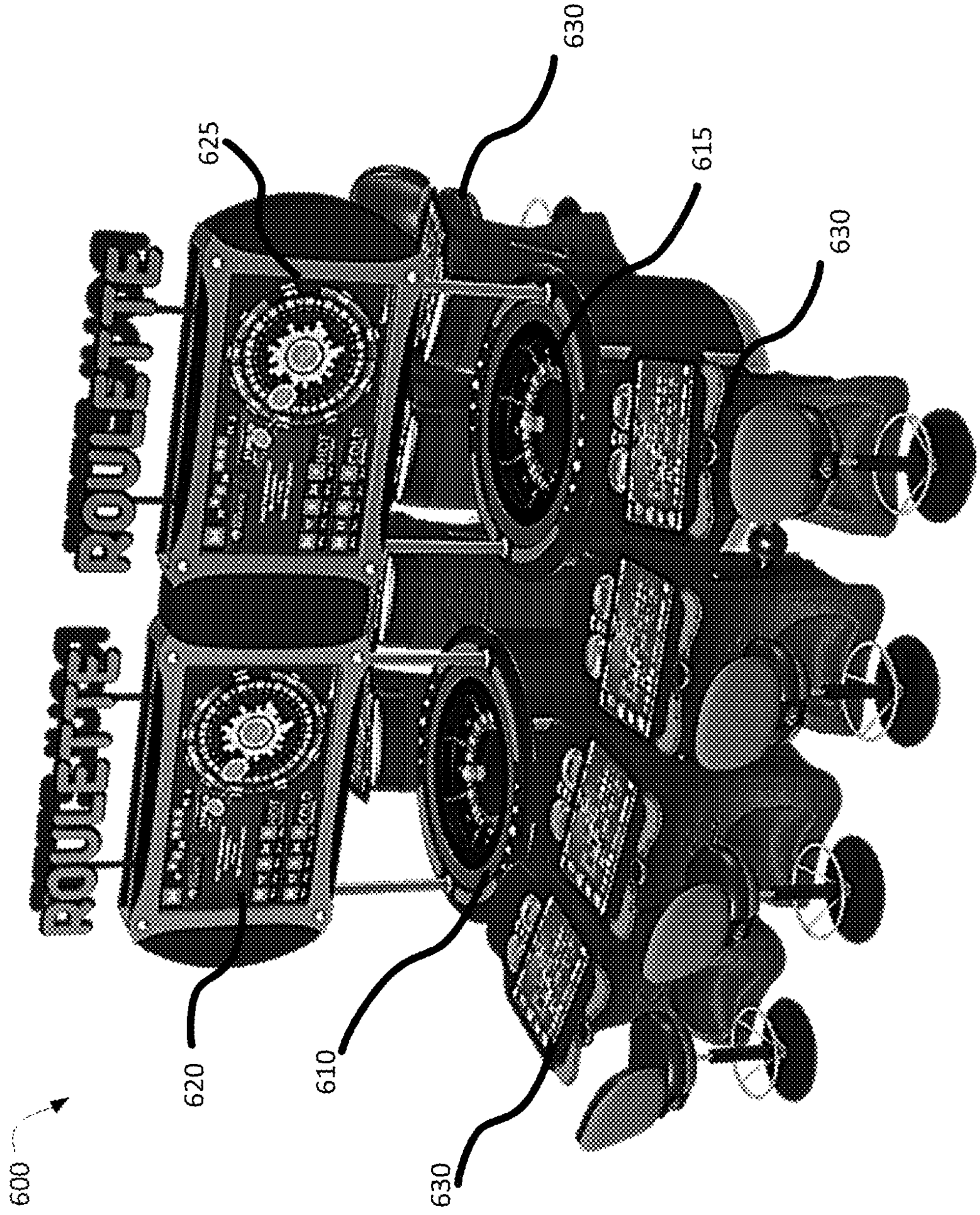
FIG. 6 is a diagrammatic, elevated view of a twin roulette wagering system, in accordance with an embodiment.

FIG. 6 illustrates an automated roulette wagering system 600 with two roulette machines in accordance with an embodiment of the present disclosure. In an embodiment, automated roulette wagering system 600 is substantially similar to automated roulette wagering system 100 of FIG. 1 with the roulette machines being similar to the roulette machine 300. As noted, however, the automated roulette wagering system 600 includes two roulette machines (i.e., roulette machines 610 and 615). In an embodiment, automated roulette wagering system 600 includes three or more roulette machines. Another notable difference between automated roulette wagering system 600 and automated roulette wagering system 100 of FIG. 1 is that roulette machines 610 and 615 each have a corresponding central display (i.e., central displays 620 and 625). In an embodiment, roulette machines 610 and 615 of automated roulette wagering system 600 may share a single central display.

By including two (or more) roulette machines, automated roulette wagering system 600 allows players to interact with two live roulette games simultaneously from a single play station among a plurality of play stations 630 and interact with a range of side bets only made possible by the two games. In an embodiment, roulette machines 610 and 615 may each have unique features that enable players to visually distinguish between the live roulette games and side games operated by each roulette machine. For example, the roulette wheel and/or betting area layouts on GUIs presented by play stations 630 may include split screens, different layouts, different colors, different patterns, and the like. While eight (8) play stations 630, four in front and four in back, are illustrated in the embodiment depicted by FIG. 6, one skilled in the art will recognize that automated roulette wagering system 600 may include any number of play stations associated with roulette machines 610 and 615.

Figure 7:
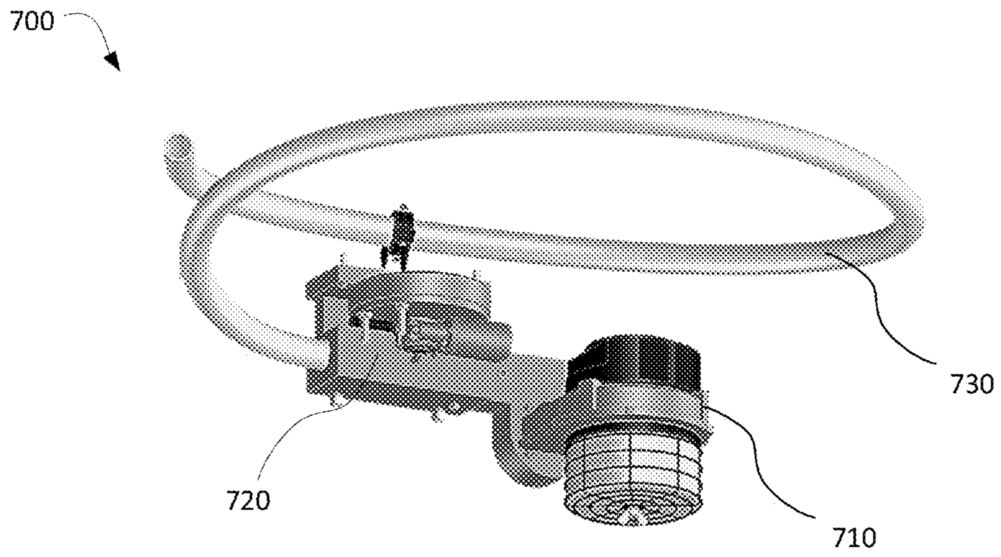
FIG. 7 is a diagrammatic, lateral view of a ball launcher assembly, in accordance with an embodiment.

FIG. 7 illustrates a ball launch assembly 700 in accordance with an embodiment of the present disclosure. As shown by FIG. 7, ball launch assembly 700 includes a propulsion assembly 710, launch device 720, and ball launch tube 730. In an embodiment, ball launch tube 730 is used to implement ball launch tube 340 of FIG. 5. Ball launch assembly 700 is configured to launch a roulette ball into the annular track at a launch point of a roulette machine (e.g., roulette machine 300 of FIGS. 3-5) coupled to ball launch assembly 700. In operation, ball launch assembly 700 receives launch commands from a controller associated with the roulette machine. Each launch command initiates a game cycle of the live roulette games operated by the roulette machine.

In response to receiving a launch command, ball launch assembly 700 introduces a roulette ball into the launch device 720, where propulsion from the propulsion assembly 710 launches the roulette ball through the ball launch tube 730. Launch device 720 imparts a motion to the ball thereby launching the roulette ball into the annular track of the roulette machine. Various means may be used by launch device 720 to impart motion to the roulette ball, such as spring-based propulsion, electromagnetic propulsion, vacuum propulsion, pressurized air propulsion, and the like. For example, launch device 720 may be implemented using a vacuum generator, a regulated air fan for blowing the ball out of the launch tube, a spring-actuated ball collider, a variable magnet, and the like.

In an embodiment, a launch command received by ball launch assembly 700 includes propulsion information that configures launch device 720 to generate a specified propulsion force, in this case from an air fan. In an embodiment, the specified propulsion force is determined based on an expected or intended velocity of the roulette ball at a launch point (e.g., launch point 350 of FIG. 5) of the annular track. In an embodiment, the specified propulsion force is determined based on an expected or intended number of ball revolutions of the annular track.

In an embodiment, a launch command received by ball launch assembly 700 includes synchronization information that configures launch device 720 to impart a motion to the roulette ball at a specified time. In an embodiment, the specified time is determined based on an intended arrival time of the ball at a launch point of the annual track. In an embodiment, the specified time is determined in part based on an output of a random number generator.

Such launch commands received by ball launch assembly 700 represent one way that casinos and other gaming establishments may optimize game cycle times for live roulette games operated by roulette machines and to synchronize two live roulette games so they operate nearly or substantially simultaneously. In this context, “substantially simultaneously” means that each live roulette games launches a ball at approximately the same time so that the two machines are operating in conjunction with one another and a player cannot manipulate any lack of synchronization by placing a bet after a normally permitted time or predicting a result. By optimizing and synchronizing game cycle times, each roulette machine may provide more live roulette games within a given period of time than it otherwise could. More live roulette games translate into improved guest satisfaction through reduced wait times for players. This increase in live roulette games also translates into increased profitability for casinos and other gaming establishments.

However, as discussed above, friction between a roulette ball and an annular track of a roulette machine that causes the roulette ball to lose momentum and settle into a ball slot may also erode some material from the annular track. That material eroded from the annular track becomes dust within a roulette wheel of the roulette machine and the annular track. Dust within the roulette wheel and the annular track interacts with roulette balls, which impacts game cycle times. For example, dust within an annular track may increase friction between a roulette ball and the annular track.

This increased friction may reduce a velocity of a roulette ball and/or a number of ball revolutions in subsequent game cycles. By reducing the velocity of a roulette ball and/or a number of ball revolutions in subsequent game cycles, game cycle times of the subsequent game cycles increase. These increased game cycle times reduce the number of live roulette games that the roulette machine may provide within a given period of time. Such reduction in live roulette games translates into decreased guest satisfaction through increasing wait times for players and reduced profitability for casinos and other gaming establishments. Moreover, this problem may be further exacerbated when friction between roulette balls and the annular track erode more material from the annual track.

While dust may be removed from a roulette machine through maintenance operations, doing so renders the roulette machine unavailable for live roulette games. An air filter within the roulette machine may help mitigate dust. However, an air filter will eventually need to be replaced as dust accumulates on the air filter. Replacing an air filter requires maintenance downtime, which again renders the roulette machine unavailable for live roulette games.

A controller associated with the roulette machine may mitigate the impact that dust has on subsequent game cycle times by improving a correlation between expected or target inertial values established for the roulette balls to measured or actual inertial values associated with the roulette balls. Such inertial values may include a number of ball revolutions in the annular track, a measured or actual velocity of a roulette ball at a launch point of the annular track, or a combination thereof. The correlation between the expected inertial values and the actual inertial values are improved by regulating a specified propulsion force generated by a ball launch assembly (e.g., ball launch assembly 700 of FIG. 7). The controller regulates the specified propulsion force generated by the ball launch assembly by adjusting propulsion information in launch commands sent to the ball launch assembly.

In an embodiment, the expected or target inertial values are established based on an expected number of game cycles operated by the roulette machine within a specified time period. For example, a casino or other gaming establishment may provide that the roulette machine is expected to operate 80 game cycles per hour. Based on the provided 80 game cycles per hour, a target number of ball revolutions may be established in order to meet the casino’s expectations.

In order to improve the correlation between the expected inertial values and the actual inertial values, the controller may determine a specified propulsion force by monitoring inertial information associated with previous roulette balls launched into the annular track and inertial-related information determined from that inertial information. In an embodiment, the controller obtains inertial information and inertial-related information from inertial sensors associated with the roulette machine (e.g., inertial sensor 360 of FIG. 5). The inertial information and the inertial-related information may include any of the examples described above with respect to FIG. 5. In an embodiment, the obtained inertial information and inertial-related information provides a feedback loop to the controller. This feedback loop assists the controller in maintaining the correlation between the expected inertial values and the actual inertial values.

FIG. 7 illustrates an embodiment in which a regulated air fan is used to implement a launch device (e.g., launch device 720 of FIG. 7). In this embodiment, a controller is mitigating an impact of dust on subsequent game cycle times by improving a correlation between a target number and an actual number of ball revolutions in an annular track per game cycle. Specifically, the controller is mitigating the impact of dust by maintaining an actual daily average number of ball revolutions in the annular track near a target daily average of fifteen (15) ball revolutions per game cycle.

Figure 8:
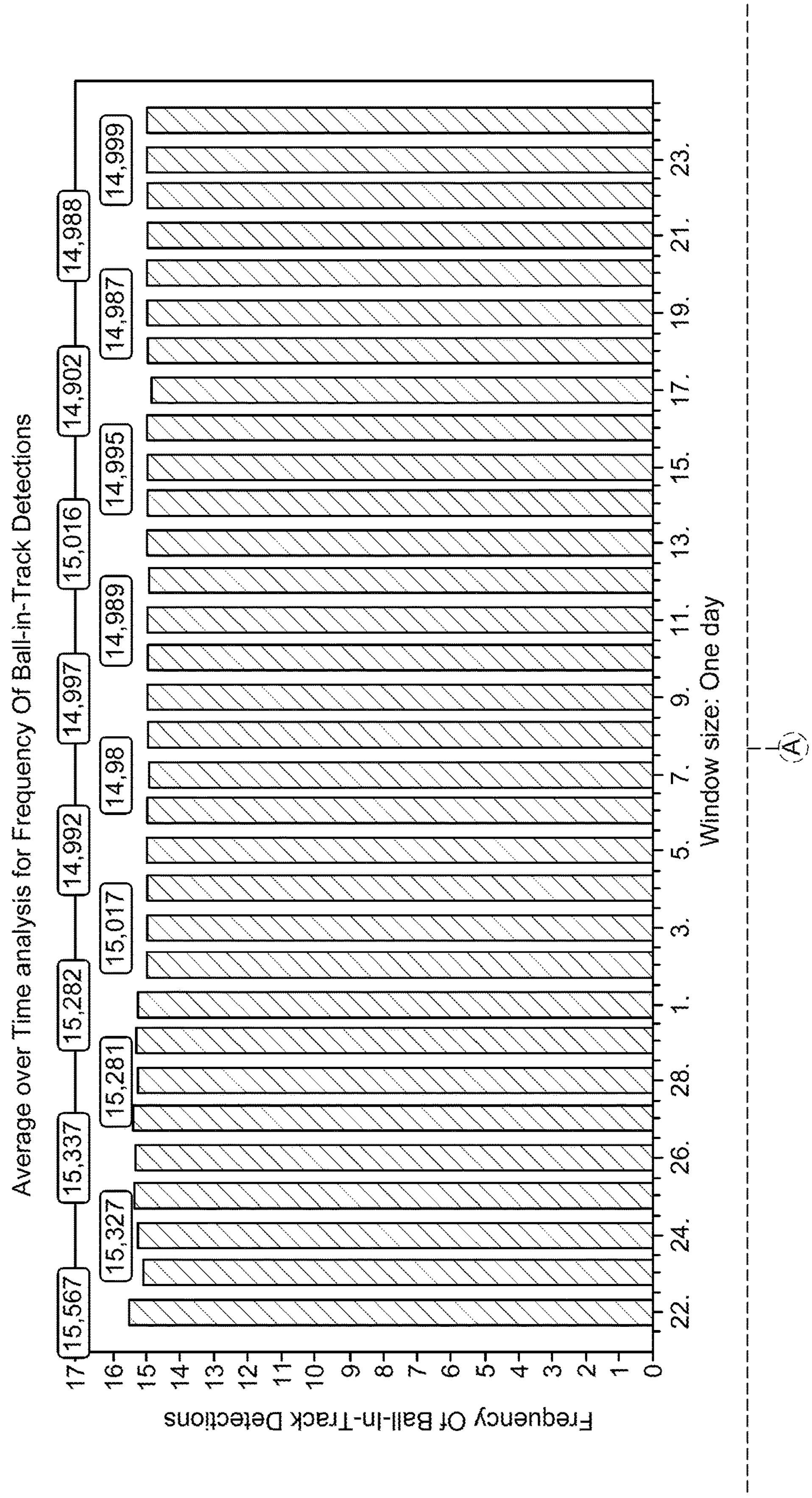
FIG. 8 is a graph comparing daily ball revolution averages to daily average propulsion force, in accordance with an embodiment.
Figure 8:
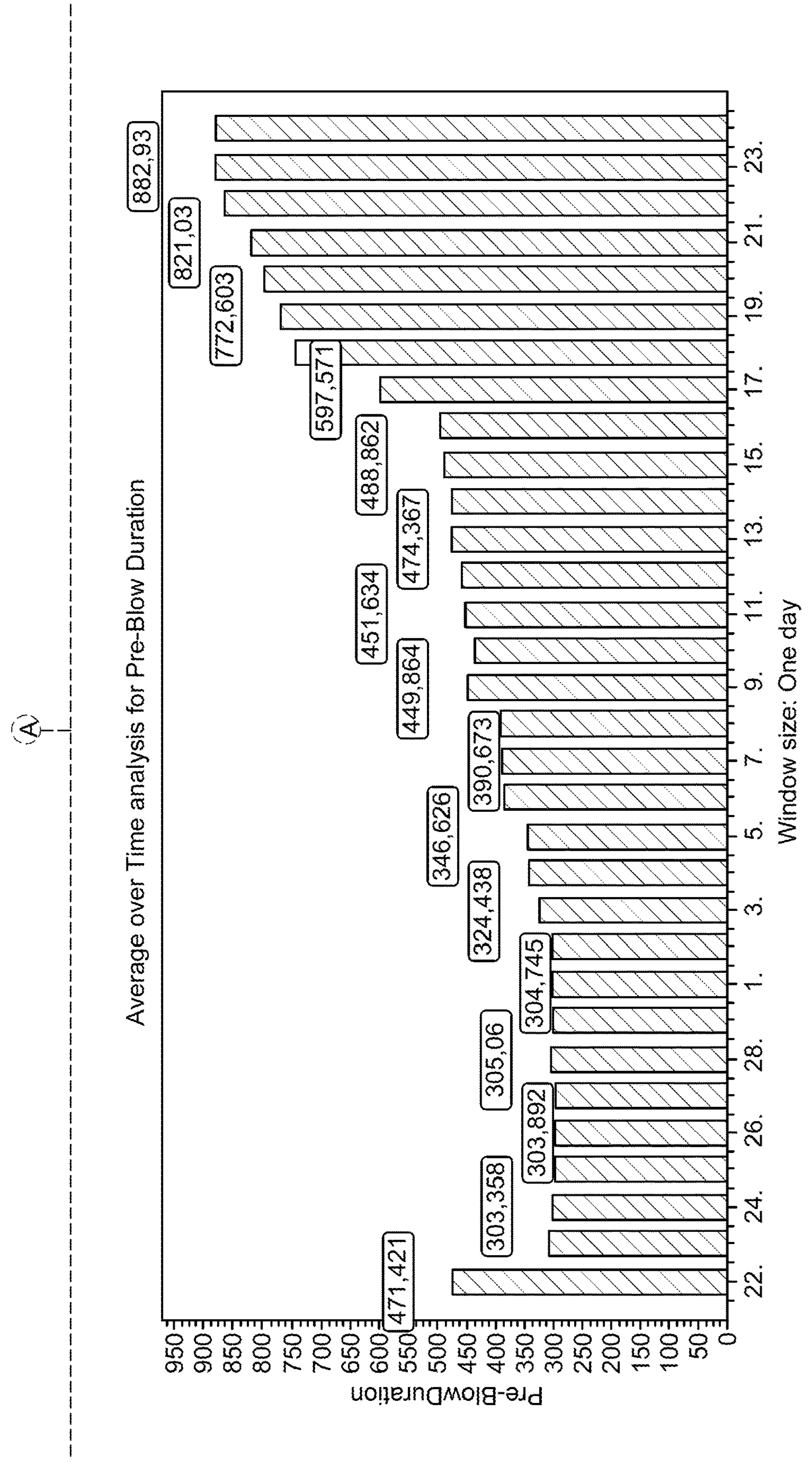

The top image in FIG. 8 shows an actual daily average number of ball revolutions per game cycle over about a month, wherein the actual daily average remains close to the target daily average number subject to some variance. The bottom image in FIG. 8 shows an actual daily average pre-blow time for the regulated air fan over the same time period illustrated by the top image in FIG. 8. In this embodiment, the actual daily average pre-blow time for the regulated air fan corresponds to the propulsion information discussed above with respect to FIG. 7.

Note that while the actual daily average number of ball revolutions per game cycle remains relatively consistent, the actual daily average pre-blow time for the regulated air fan steadily increases. This steady increase in daily average pre-blow time may represent an attempt by the controller to improve a correlation between target values and actual values over this time period in order to mitigate the impact of accumulating dust on subsequent game cycle times. That is, the controller in this embodiment is causing the regulated air fan to generate an increasing amount of propulsion force by adjusting the pre-blow time in order to account for dust accumulating in the roulette machine over this time period.

In an embodiment, a controller may monitor propulsion information sent to a ball launch assembly relative to a predetermined threshold amount. In this embodiment, the controller may trigger a maintenance alert in response to determining the propulsion information exceeds the predetermined threshold amount. The maintenance alert may provide an indication that the roulette machine requires a maintenance operation to remove accumulated dust.

Monitoring inertial information and inertial-related information associated with the previously launched roulette balls provides another way that casinos and other gaming establishments may optimize betting window times. Specifically, betting window times may be optimized in part by adjusting bet close times based on the monitored inertial information and inertial-related information. In order to improve guest satisfaction by maximizing the excitement and attractiveness of the live roulette games operated by a roulette machine, betting windows should remain in an open state as long as possible.

However, this may adversely affect a profitability of a roulette machine for casinos and other gaming establishments using the roulette machine. If the betting window remains in an open state too long, a likelihood of predicting game cycle results may increase. An increase in the likelihood of predicting game cycle results provides players with an unfair advantage that may lead to higher payouts.

One approach to make sure that the betting window does not remain open too long is to set a bet close time of the betting window using a predefined delay. Under this approach, a roulette ball is launched into an annular track and after the predefined delay the bet close time is set. The predefined delay may be determined based on previous game cycle observations, which ensures that the bet close time is set before players gain the unfair advantage.

If the betting window is closed too soon, players may place fewer bets on a particular game cycle than they otherwise would have. With fewer bets placed on a particular game cycle, less money is available to the casino in the form of lost bets. In either case-too long or too early-non-optimized betting window times adversely affect the profitability of the roulette machine. Therefore, a controller associated with a roulette machine operating live roulette games may increase a profitability of the roulette machine by optimizing the betting window times associated with the live roulette games.

In optimizing a betting window of a current game cycle, the controller may obtain inertial information and inertial-related information associated with a roulette ball used in the current game cycle. In an embodiment, the controller may obtain the inertial information, the inertial-related information, or a combination thereof from one or more inertial sensors (e.g. inertial sensor 360 of FIG. 5) of the roulette machine. The inertial information and the inertial-related information may include any of the examples described above with respect to FIG. 5.

Using the obtained inertial information and inertial-related information, the controller can determine the bet close time of the betting window. For example, a controller may obtain a velocity measurement for a roulette ball at a launch point of an annular track. Using the velocity measurement for that roulette ball, the controller can determine a bet close time that ensures the betting window closes before players gain an unfair advantage. As such, the controller tailored the bet close time for that game cycle based on inertial information and inertial-related information associated with the roulette ball used in that game cycle. Therefore, betting windows of game cycles using faster roulette balls may remain in an open state longer than betting windows of game cycles using slower roulette balls.

Figure 9:
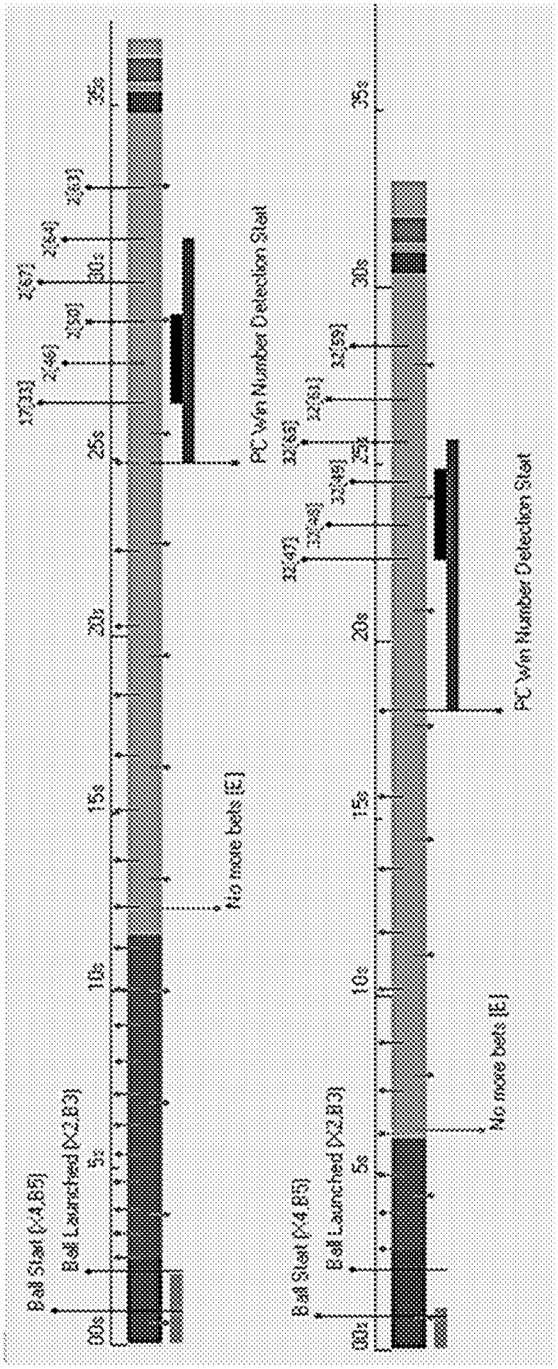
FIG. 9 illustrates timelines comparing bet close times of game cycles based on relative velocities of roulette balls used in the game cycles, in accordance with an embodiment.

An embodiment of such tailoring of bet close times using inertial information and inertial-related information associated with the roulette ball used in that game cycle is illustrated in FIG. 9. Specifically, the top and bottom images in FIG. 9 each represent a timeline for a particular game cycle. The top image in FIG. 9 shows a timeline for a game cycle that uses a faster roulette ball (e.g., a roulette ball with a higher velocity at a launch point) than the game cycle associated with the timeline shown in the bottom image.

Comparing the timelines in FIG. 9 demonstrates that a bet close time for the game cycle using the faster roulette ball (i.e., the top image) is set later than the game cycle using the slower roulette ball (i.e., the bottom image). Accordingly, a betting window for the game cycle using the relatively faster roulette ball remains in an open state longer than the game cycle using the relatively slower roulette ball. Yet, both game cycles have a substantially similar number of ball revolutions following their respective bet close times.

In an embodiment, a controller may estimate a number of ball revolutions following the determined bet close time for a game cycle. In this embodiment, the controller may obtain an actual number of ball revolutions following the determined bet close time for the game cycle. The controller may determine a delta value representing a difference between the estimated number and actual number of ball revolutions following the determined bet close time for the game cycle. The controller may adjust a bet close time for one or more subsequent game cycles based on the determined delta value. In some embodiments, a controller may obtain inertial information and inertial-related information associated with previous game cycles. In these embodiments, the controller may determine a bet close time based in part on the inertial information and inertial-related information associated with the previous game cycles.

Another way that casinos and other gaming establishments may optimize and synchronize game cycle times is through random adjustments in a rotation speed of a roulette machine's roulette wheel (e.g., roulette wheel 320 of FIG. 5). By randomly adjusting the rotation speed of the roulette wheel, a likelihood of predicting game cycle results may be reduced. As mobile devices (e.g., smart phones and tablets) with increased computational capacity and higher resolution image sensors become generally accessible, individuals may exploit such mobile devices to gain an unfair advantage in predicting game cycle results. For example, a game cycle result may theoretically be estimated from such data as an initial position of a roulette wheel, a rotation velocity of the roulette wheel, a ball launch position, a velocity of a roulette ball, and the like.

As discussed above, each live roulette game operated by the roulette machine is composed of a game cycle and a betting window associated with the game cycle. Moreover, the betting window includes a bet close time after which players are no longer allowed to place bets on the associated game cycle. Since players are no longer allowed to place bets after the bet close time, the individuals attempting to gain an unfair advantage cannot account for any adjustments made to the live roulette game following the bet close time. Factors such as the initial position of the roulette wheel, the ball launch position and the velocity of the roulette ball may not be adjustable after following the bet close time. However, a rotation velocity of the roulette wheel remains adjustable following the bet close time. Therefore, a controller associated with the roulette machine may mitigate any unfair advantage, for example if the launch times of two different roulette machines were not at the exact same time, by adjusting the rotation velocity of the roulette wheel of one or both machines following the bet close time.

The controller may adjust a rotation velocity of a roulette wheel by sending a rotation adjustment command to one or more mechanical components associated with the roulette wheel's rotation. Examples of such mechanical components include a braking apparatus applying a braking force to the roulette wheel, a driving apparatus applying a driving force that causes the roulette wheel to rotate, and the like.

The rotation adjustment command may include a velocity delta value that specifies an expected rotation velocity following the velocity adjustment, a trigger time that specifies when the velocity adjustment is to be initiated, or a combination thereof. In an embodiment, the velocity delta value and the trigger time are each determined using input data from independent random number generators. In an embodiment, the velocity delta value and the trigger time are each determined using input data from a single random number generator.

A velocity delta value may be determined based on an expected rotation velocity of the roulette wheel as measured prior to a bet close time of a betting window for a particular game cycle. In an embodiment, an expected rotation velocity specified by the velocity delta value is less than an average human visual perception time. As used herein, an average human visual perception time refers to the minimal variance in a visual stimulus that an average human may perceive. In an embodiment, velocity delta values vary from game cycle to game cycle.

The trigger time of the rotation adjustment command may be any point in time subsequent to a bet close time of a betting window for a particular game cycle. Moreover, the trigger time of the rotation adjustment command may be any point in time after a roulette ball is launched into the annular track. In an embodiment, the trigger time of the rotation adjustment command is determined based on an estimation of when the roulette ball will exit the annular track. In an embodiment, the trigger time of the rotation adjustment command is determined based on an estimation of when the roulette ball will be launched into the annular track. In an embodiment, the trigger time of the rotation adjustment command is determined based on an expected number of ball revolutions in the annular track.

In an embodiment, a braking apparatus associated with the roulette wheel may adjust a braking force applied to the roulette wheel in response to the rotation adjustment command. For example, the braking apparatus may increase the braking force applied to the roulette wheel in response to the rotation adjustment command. As another example, the braking apparatus may decrease the braking force applied to the roulette wheel in response to the rotation adjustment command.

In an embodiment, a driving apparatus associated with the roulette wheel may adjust a driving force that spins the roulette wheel in response to the rotation adjustment command. For example, the driving apparatus may increase the driving force thereby causing the roulette wheel to spin faster in response to the rotation adjustment command. As another example, the driving apparatus may decrease the driving force thereby causing the roulette wheel to spin slower in response to the rotation adjustment command.

Figure 10:
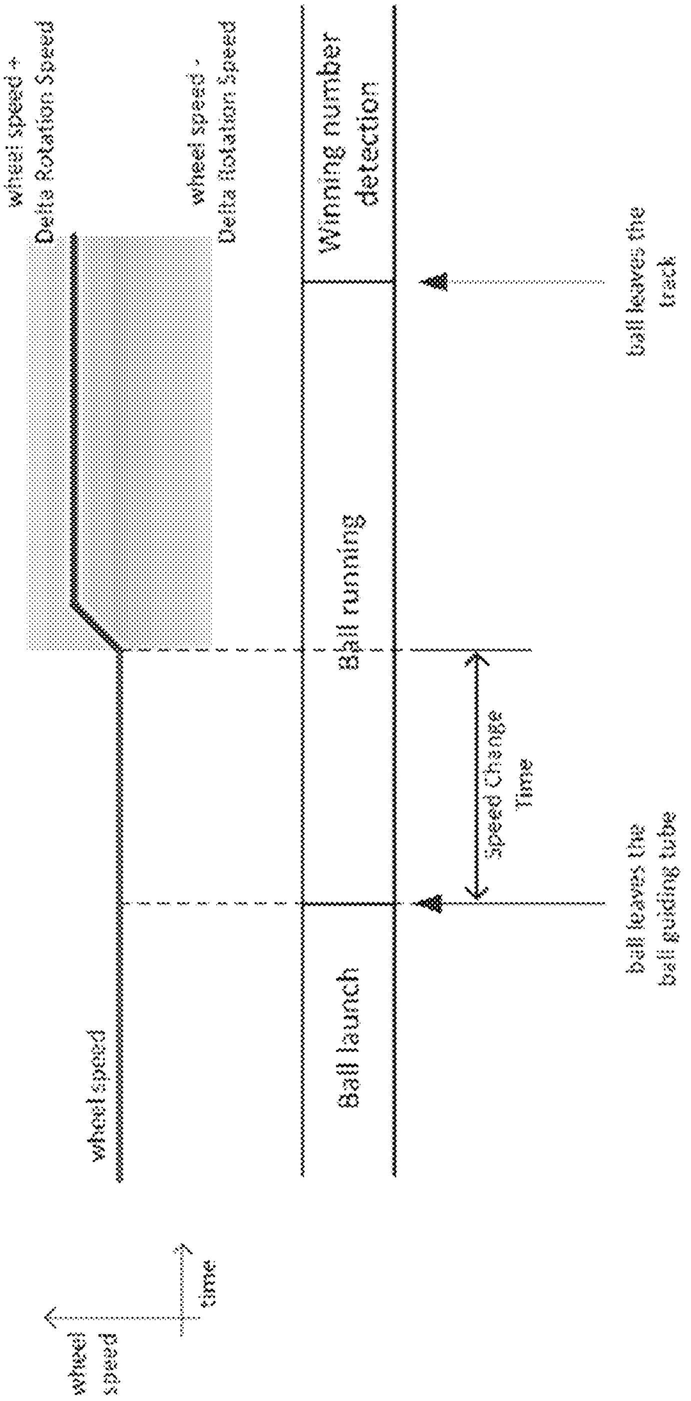
FIG. 10 is a graph illustrating a roulette wheel velocity adjustment to reduce a likelihood of predicting game cycle results, in accordance with an embodiment.

FIG. 10 illustrates an embodiment in which a controller sends a rotation adjustment command to a driving apparatus associated with a roulette wheel. In FIG. 10, a rotation velocity (or wheel speed) of the roulette wheel is illustrated as a function of time. The timeline sections along the bottom of FIG. 10 (i.e., "Ball launch," "Ball running," and "Winning number detection") are provided to illustrate a timing of a velocity adjustment relative to a timing of an underlying game cycle.

As shown in the embodiment depicted by FIG. 10, the rotation velocity of the roulette wheel remains substantially constant until some point in time after a roulette ball is launched into an annular track. After the roulette ball is launched into the annular track, a bet close time occurs, which transitions a betting window associated with the game cycle from an open state to a closed state. In the embodiment depicted by FIG. 10, the bet close time occurs at any point within a "Speed Change Time."

Within the "Speed Change Time," the driving apparatus receives the rotation adjustment command that includes a trigger time annotated by a dotted line at the end of the "Speed Change Time." The rotation adjustment command further includes a velocity delta value that specifies an expected rotation velocity (i.e., wheel speed+Delta Rotation Speed) following the velocity adjustment. In response to the rotation adjustment command, the driving apparatus increases the driving force that spins the roulette wheel thereby causing the roulette wheel to spin faster. Following the velocity adjustment, the rotation velocity of the roulette wheel becomes substantially constant again before the roulette ball settles into a ball pocket and a game cycle result is detected.

Figure 11:
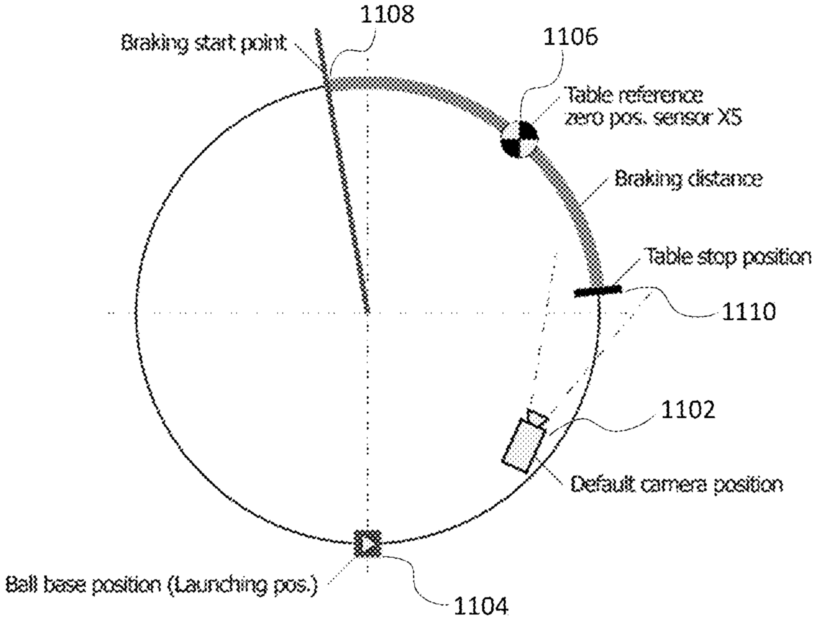
FIG. 11 shows a camera position for detecting roulette results, in accordance with an embodiment.
Figure 12:
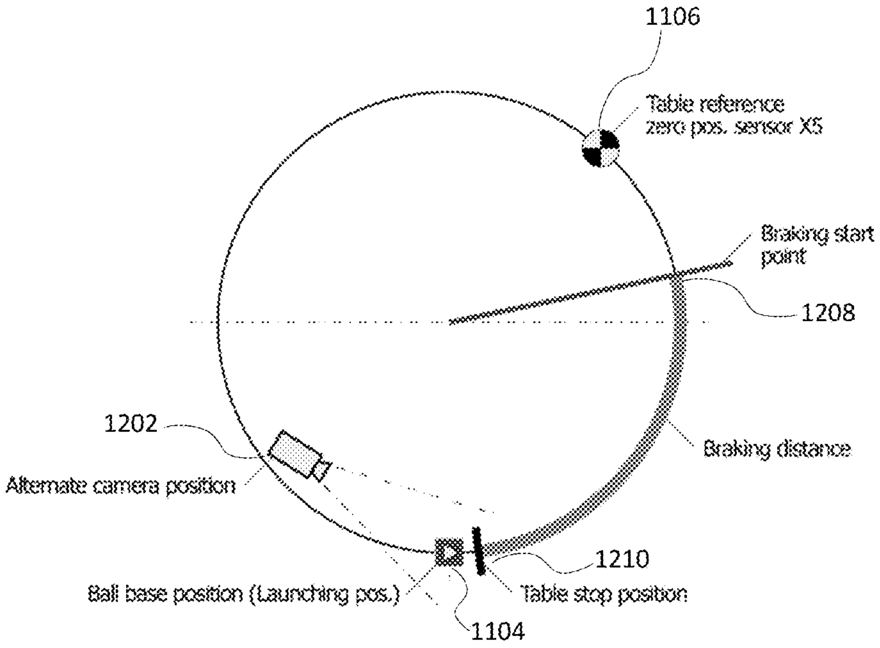
FIG. 12 shows an alternate camera position for detecting roulette results, in accordance with an embodiment.

Another way in which the roulette machine can be adjusted to speed up game play or to synchronize multiple machines involves the manner in which each roulette wheel is stopped in order to show the ball in a number slot at the conclusion of a game cycle. FIGS. 11 and 12 illustrate alternative image sensor or camera positions and the points at which braking needs to be started in order for the table to stop at a position where the camera will be able to collect an image of the ball in the number slot. FIG. 11 illustrates a default position 1102 of the camera and FIG. 12 illustrates an alternative position 1202 of the camera. In each case, the ball base of launch position 1104 remains the same as does the position detection sensor 1106. In FIG. 11, however, the braking starting point 1108 and table stop position 1110 are different from the braking starting point 1208 and table stop position 1210 of FIG. 12, so as to align the winning number slot with the position of the camera. The braking starting points 1108 and 1208 are illustrative only and depend on the braking system's actually ability to brake.

While optimizing and synchronizing game cycle times between two roulette machines may enable side bets and improve a roulette machine's profitability, improving guest satisfaction of player interacting with the roulette machine may further improve the profitability. As previously noted, one of the most distinctive and thrilling sounds associated with live roulette games is produced when the roulette ball leaves the annular track, hits a ball stop, and bounces about the roulette wheel before coming to rest in one of the ball slots. A controller associated with the roulette machine may leverage those distinctive and thrilling sounds to improve guest satisfaction. The controller may leverage those distinctive and thrilling sounds by obtaining audio associated with a roulette ball used in a game cycle. In an embodiment, the controller obtains such audio from audio sensors (e.g., a microphone) within the roulette machine. In an embodiment, the controller obtains such audio from audio sensors external to the roulette machine.

Upon obtaining the audio, the controller may analyze the audio to detect specific game cycle events. Examples of the game cycle events include a roulette ball being launched into an annular track, the roulette ball rotating around the annular track, the roulette ball exiting the annular track, the roulette ball hitting one or more ball stops, the roulette ball bouncing about a roulette wheel, the roulette ball settling into a particular ball slot of the roulette wheel, and a game cycle result determination. In an embodiment, the controller may filter the obtained audio to minimize background noise captured by the audio sensors.

Instead of simply amplifying the obtained audio, the controller may generate sound effects based on a current theme surrounding the roulette machine. That is, the obtained audio may be used to generate sound effects that complement the current theme. In an embodiment, a different sound effect may be generated for each game cycle event. In an embodiment, each sound effect may be modified based on inertial information and/or inertial-related information associated with a roulette ball used in that game cycle. In an embodiment, the generated sound effects may be output by audio output devices within the roulette machine (e.g., audio output devices 380 of FIG. 3). In an embodiment, the generated sound effects may be output by audio output devices external to the roulette machine.

For example, a casino or other gaming establishment may have a Hawaiian-themed night. In this example, a controller may use the obtained audio to generate sound effects that complement the Hawaiian-themed night. The generated sound effects may include a Polynesian song associated with a hula dance. The controller may cause a loud intro to the Polynesian song to be played when the controller detects a roulette ball being launched into an annular track using the obtained audio. The controller may increase a tempo of the Polynesian song based on a velocity of the roulette ball when the controller detects the roulette ball rotating around the annular track. The controller may introduce a beat into the Polynesian song when the controller detects the roulette ball bouncing about a roulette wheel.

Figure 13:
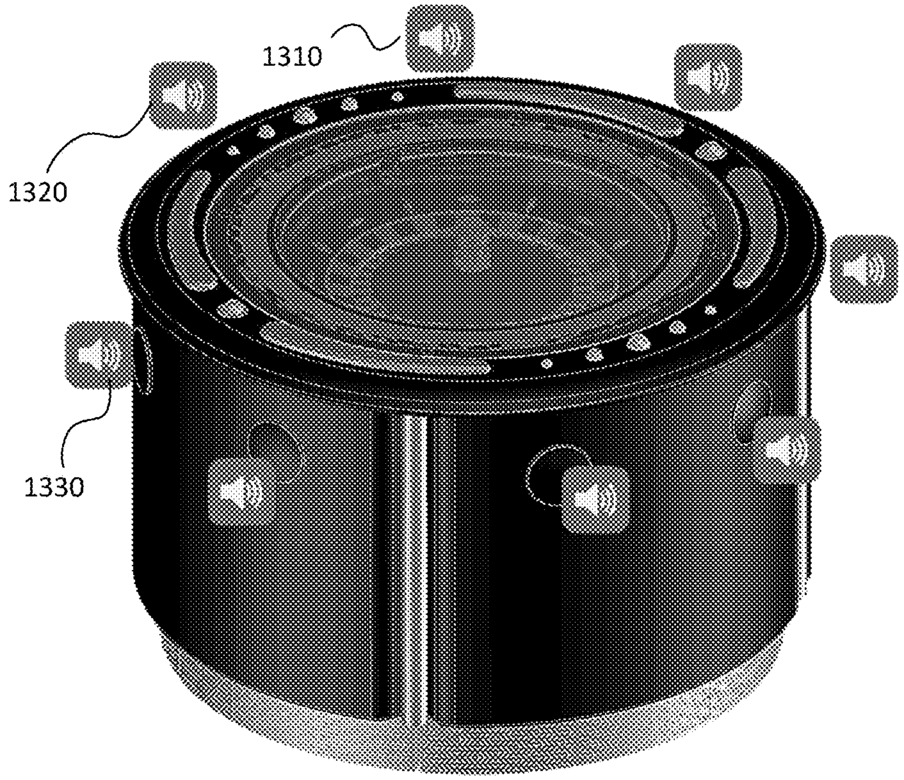
FIG. 13 is an image depicting a visual effect associated with a live roulette game, in accordance with an embodiment.
Figure 14:
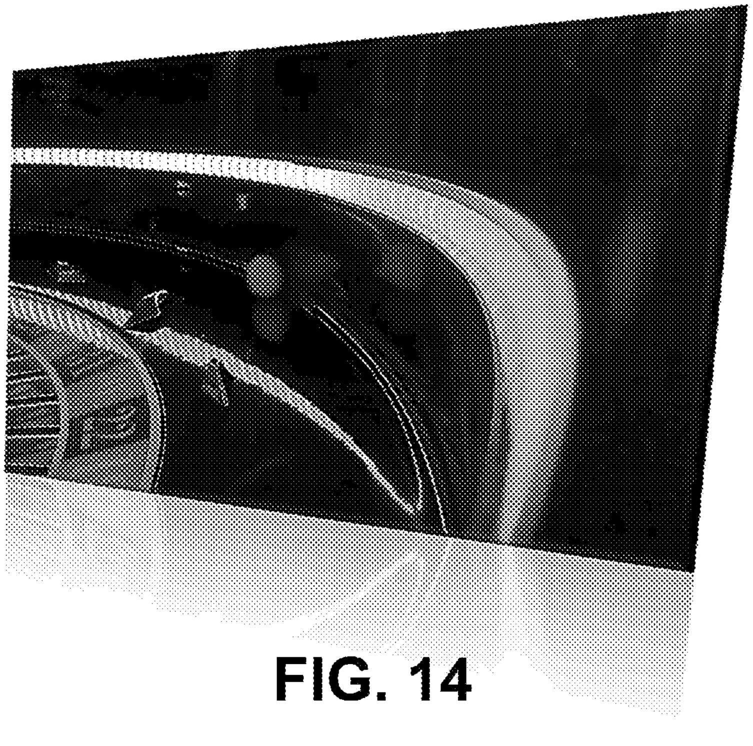
FIG. 14 illustrates a means of presenting sound effects associated with a live roulette game, in accordance with an embodiment.

In addition to generating sound effects, the controller may use the game cycle events detected with the obtained audio to present information associated with the roulette machine to players and other guests. For example, a plurality of audio output devices may be positioned around an outer circumference of the roulette machine as shown by FIG. 13. The controller may cause each of the plurality of audio output devices to sequentially produce audible indications as the roulette ball passes by. That is, an audio indication is produced by the audio output device associated with designator 1310 as the roulette ball passes, then by the audio output device associated with designator 1320, the audio output device associated with designator 1330, and so on. FIG. 14 illustrates an example in which a plurality of visual output devices (e.g., LED lights) positioned around an outer circumference of the roulette machine are used to produce visual indications as the roulette ball passes by as well as other events. Lighting events include a stand by state, a ball launched state, a ball out state, a ball in track state, a bets closed state, a track off state, a temporary result state, a result state, a golden ball state and an error state. In an embodiment, the visual output devices may be utilized as programmable screen savers when the roulette machine is not operating live roulette games.

Referring back to FIG. 6, in an embodiment of a multiple roulette machine system, a single controller (not depicted) may interact with roulette machines 610 and 615 to control various mechanical aspects of the live roulette games operated by each respective roulette machine. For example, the single controller may synchronize game cycles of the live roulette games operated by roulette machines 610 and 615. Synchronizing the game cycles of roulette machines 610 and 615 would allow automated roulette wagering system 600 to operate in two modes of play. In an embodiment, the single controller synchronizes the game cycles of roulette machines 610 and 615 by issuing launch commands to a ball launch assembly (e.g., ball launch assembly 700 of FIG. 7) associated with each roulette machine. Using the launch commands, the single controller instruct each ball launch assembly's respective launch device (e.g., launch device 720 of FIG. 7) to impart a motion to a roulette ball at a specified time.

In a first mode of play, roulette machines 610 and 615 may operate in series such that game cycle results associated with each respective roulette machine are determined in sequence. That is, a game cycle result associated with a game cycle operated by roulette machines 610 is determined before a game cycle result associated with a game cycle operated by roulette machines 615 in the first mode of play. Determining game cycle results in sequence enables a next game to be started immediately as a prior game concludes, which would be faster than possible with a single roulette machine, thereby providing players with an opportunity to interact with an increased number of live roulette games thereby reducing each player's downtime.

In a second mode of play, roulette machines 610 and 615 operate in parallel such that game cycle results associated with each respective roulette machine are determined concurrently or substantially simultaneously. That is, a game cycle result associated with a game cycle operated by roulette machines 610 is determined at the same time as a game cycle result associated with a game cycle operated by roulette machines 615 in the second mode of play. Concurrently determining game cycle results provides players with an opportunity to place side bets based on game cycle results from both game cycles operated by roulette machines 610 and 615. Examples of such side bets include wagers on which roulette machine's game cycle result will be associated with a higher number, which roulette machine's game cycle result will be associated with a lower number, whether an aggregate of the numbers associated with each roulette machine's game cycle results will be above or below a specified number, whether a color associated with each roulette machine's game cycle results will be the same or different, and the like.

Figure 15:
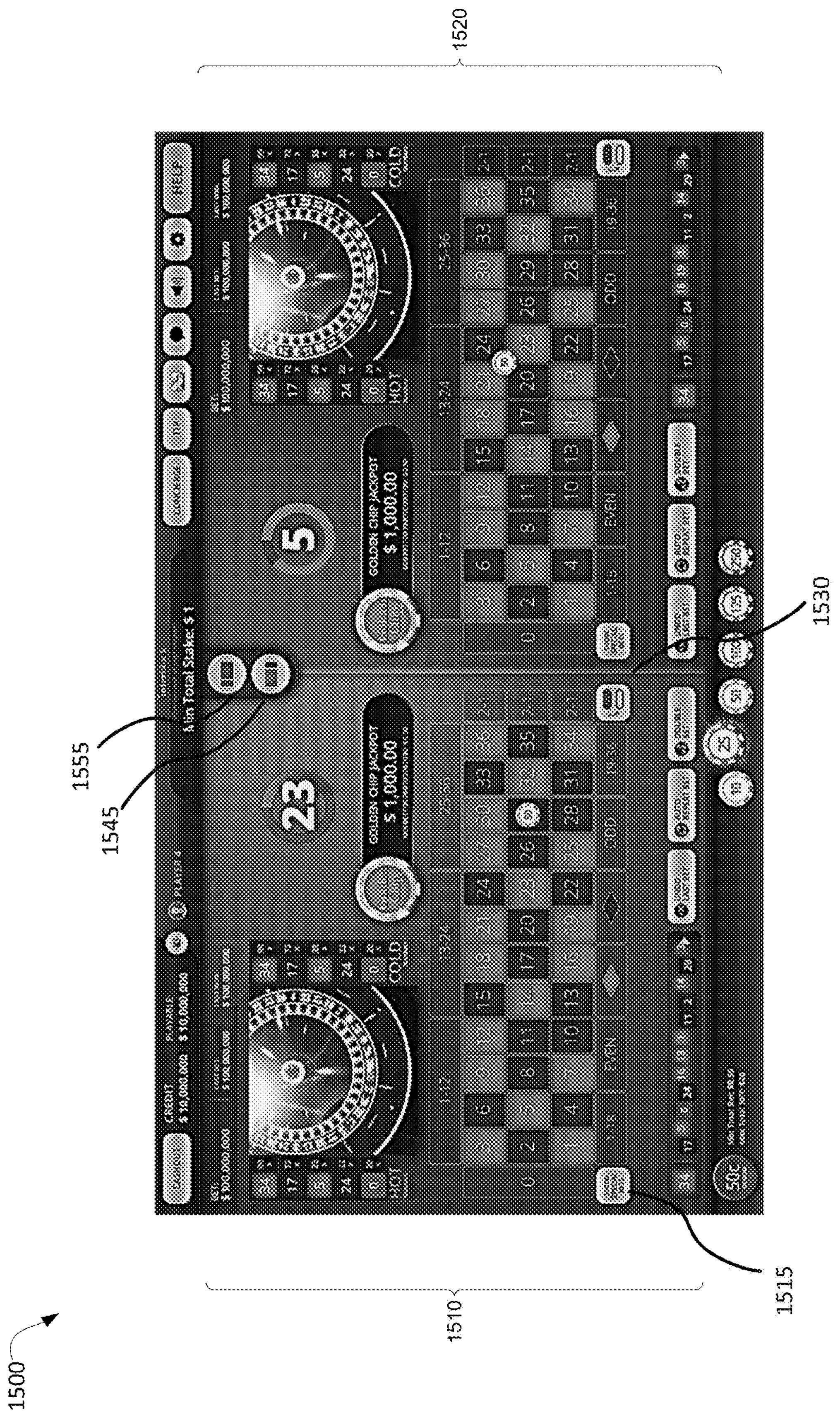
FIG. 15 illustrates an example split-screen GUI displayed by a play station, in accordance with an embodiment.
Figure 16:
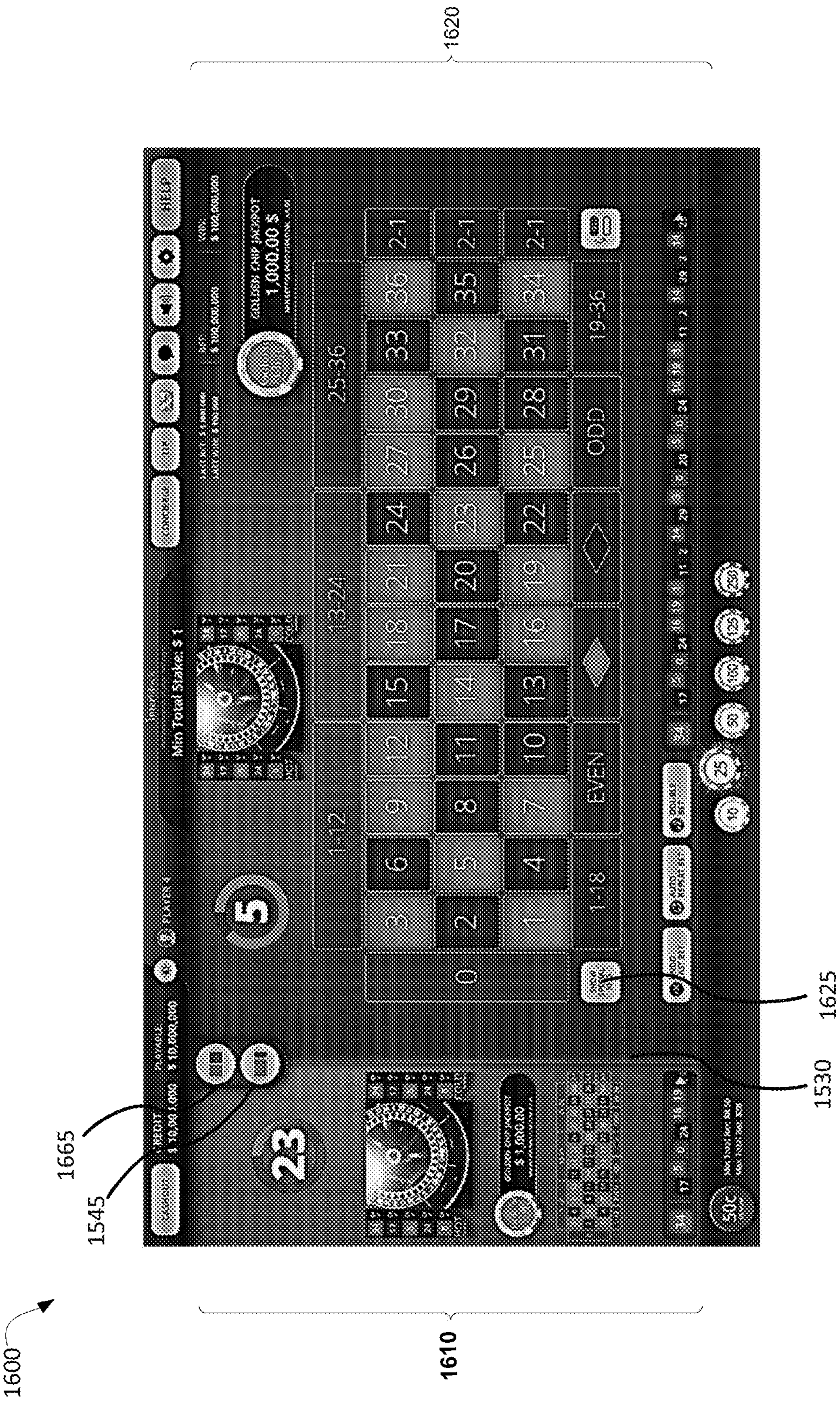
FIG. 16 illustrates an example accordion-screen GUI displayed by a play station, in accordance with an embodiment.

Each play station among the plurality of play stations 630 is generally configured to enable a player to participate in the live roulette games operated by roulette machine 610, roulette machine 615, or a combination thereof. In an embodiment, each play station among the plurality of play stations 630 is further configured to enable the player to participate in two live roulette games at once and a side bet based on the results of the two live roulette games. As best illustrated in FIGS. 15 and 16, play station 630 may present a GUI (e.g., GUI 1500 or GUI 1600) that enables a player to concurrently participate in the live roulette games operated by both roulette machines (i.e., roulette machines 610 and 615). FIGS. 15 and 16 illustrate that GUIs 1500 and 1600 each present the player with similar information and functionalities associated with the live roulette games, as discussed above with respect to GUI of FIG. 2. Accordingly, such information and functionalities will not be described here to avoid obscuring more pertinent aspects of the embodiments depicted by FIGS. 15 and 16.

FIG. 15 illustrates an example in which play station 630 presents a player with a split-screen GUI (GUI 1500) for interacting with the live roulette games operated by roulette machines 610 and 615. GUI 1500 includes a first game play area 1510 and a second game play area 1520 that each represent a portion of GUI 1500's available display area. As shown by the example depicted by FIG. 15, the portions of GUI 1500's available display area allocated to first game play area 1510 and second game play area 1520 are approximately equal. First game play area 1510 and second game play area 1520 are allocated for presenting the player with information and functionalities associated with the live roulette games operated by roulette machines 610 and 615, respectively.

A "show special bets" icon (e.g., icon 1515) may be provided in a game play area. The "show special bets" icon presents the player with an opportunity to place one or more side bets associated with the live roulette games operated by roulette machines 610 and 615. This icon 1515 may just be labeled "side bets". Sides bets are further discussed in reference to FIG. 17.

In the example depicted by FIG. 15, first game play area 1510 and second game play area 1520 are separated by a demarcation line 1530 that provides another means of visually distinguishing each game play area. However, some embodiments of the present disclosure may omit demarcation line 1530. Above demarcation line 1530 in GUI 1500 are toggle icon 1535 and 1545.

Toggle icon 1545 and 1555 are configured to adjust a relative sizing of first game play area 1510 and second game play area 1520. Specifically, toggle icon 1545 may 1545 may enable the player to increase the portion of available screen area allocated to first game play area 1510 while reducing the portion of available screen area allocated to second game play area 1520. In contrast, toggle icon 1555 may enable the player to increase the portion of available screen area allocated to second game play area 1520 while reducing the portion of available screen area allocated to first game play area 1510. Adjusting the relative sizing of first game play area 1510 and second game play area 1520 may present the player with an accordion-screen GUI (e.g., GUI 1600 of FIG. 16).

FIG. 16 illustrates an example in which the player selected toggle icon 1555. In response, play station 630 presents the player with the accordion-screen GUI (GUI 1600). Increasing the portion of available screen area allocated to a particular game play area presents that game play area in an enlarged state (e.g., second game play area 1620). In addition to adjusting the relative sizing of game play areas, GUI 1600 also includes toggle icon 1665 that enables the player to return to a split-screen GUI (e.g., GUI 1500 of FIG. 15).

In an enlarged state, a game play area presents the player with at least the same information and functionalities as would be presented to the player in a split-screen GUI (e.g., GUI 1500). In an embodiment, increasing a portion of available screen area allocated to a particular game play area presents a player with additional information, additional functionalities, or a combination thereof.

Reducing the portion of available screen area allocated to a particular game play area presents that game play area in a shrunk state (e.g., first game play area 1610). In a shrunk state, a game play area presents the player with less information and/or functionalities than would be presented to the player in a split-screen GUI (e.g., GUI 1500). For example, first game play area 1610 does not present the player with information regarding a last bet placed or a last bet won on the live roulette games operated by roulette machine 610. In an embodiment, a game play area in a shrunk state presents a player with a minimal amount of information regarding a game of chance as specified by an appropriate licensing authority.

As another example, first game play area 1610 does not present the player with a "show special bets" icon. In contrast, second game play area 1620 in the enlarged state retains a "show special bets" icon 1625. In an embodiment, a game play area in a shrunk state only provides a player with an opportunity to repeat a bet on a game of chance that was placed prior to entering the shrunk state. In this embodiment, the player may resize the game play area in the shrunk state for an opportunity to place any other bets besides the bet that was placed prior to entering the shrunk state. For example, the player may select toggle icon 1665 to return to a split-screen GUI (e.g., GUI 1500) or select toggle icon 1545 to increase the portion of available screen area allocated to first game play area 1610 while reducing the portion of available screen area allocated to second game play area 1620.

Roulette wagering systems such as roulette wagering system 600 with numerous play stations and two or more roulette machines may enable novel side bets to be run on the roulette wagering system. In an embodiment, only a single game play area 1620 may be required even through there are two or more roulette machines. When no side bet is being played, only a first roulette machine may be utilized for results of a base game that follows standard roulette game rules. A player may have the option, however, of placing one or more side bets. When a side bet is played, the second roulette machine may be utilized to enable the side bet. The GUI for the side bet may be incorporated into the game play area 1620 in a manner as further described with respect to FIG. 17. When a side bet is played, both roulette machines may be required to launch a roulette ball at substantially the same time so results are generated at substantially the same time and game play can be maintained at a steady pace. The techniques described herein for launching roulette balls at the same time in two different machines and for adjusting for variations in the separate roulette machines through alteration of the launch, altering ball speed, altering wheel speed, and altering braking may all come into play to maintain the simultaneity of the two roulette machines.

Some of the side bets may be similar to proposition bets that are available on craps tables and some may be different, but each side bet takes advantage of the fact that the result of each roulette machine is a number, such as 0, 00 or between 1-36, in a manner similar to how the results in craps is a number, between 1-6, on each of two thrown dice. Most craps proposition bets are one-roll bets, meaning that the outcome of a wage is determined by the results of the next roll. There is one type of proposition bet, called "hardways" that remain active through one or more rolls of the dice. Each of the different bets have different odds of being hit and accordingly different payout that guarantees the house edge. For example, the odds of a bet might be 17:1, but the payout is 15:1, which guarantees a house edge of 11.11% over time. Proposition bets include aces or snake-eyes (where both dice are "1"), ace-deuce or three craps (where two dice equal "3"), eleven (where two dice equal "11"), boxcars or twelve (where two dice equal "12"), high-low (where one dice is "1" and one dice is "6"), etc. Hardway bets win when a pair of the same numbers are rolled, such as "3" and "3" or "5" and "5" prior to "7" being rolled. As with hardway bets, some proposition bets include combinations that are only possible with craps, such as some number or combination of numbers being rolled before another number is rolled, such as craps (which would be "2", "3" or "12"). As the results of a roulette game does not roll over as is possible in craps, a novel side bet is required.

In an embodiment, the side bet may be a type of matching bet. For example, the side bet may be a winning combination, where the player places a bet or wager on a single number for both roulette machines, such as "49" and if the result of roulette machine 1 is "15" and the result of roulette machine 2 is "34", the total of which matches "49" then the wager is won. A player choosing this side bet would be provided the choice of a number between 0-70 or 1-72 in in an available screen space in game play area 1620 or in a split-screen space similar to game play area 1620. The matching bet may also be based on a range of results. For example, one number range out of the number ranges 1-8, 9-15, 16-21, 22-28 and 29-36 may be selected by the player and if the combined result of both roulette machines is a number that falls within the selected range, the bet is won. As the odds of winning improve with the greater the numbers in the range, the payout is reduced accordingly. The 1-8 range may have a payout of 47:1 while the 29-36 range has a payout of only 5:1. These ranges are just examples and other ranges may be used with correspondingly different payouts depending the probability of the numbers in the range resulting from the outcome of the roulette machines.

In an embodiment, the side bet may be another type of matching bet, such as the same or lucky number, where the result of both roulette machines has to be the same number selected by the player for the player to win. The number to be chosen by the player may be any number of the wheel of the roulette machines or some specific set of numbers. An easier bet, with a corresponding lower payout, may be matching the result of only a single specific roulette machine to a player chosen number or matching the result of any roulette machine to the player chosen number.

Figure 17:
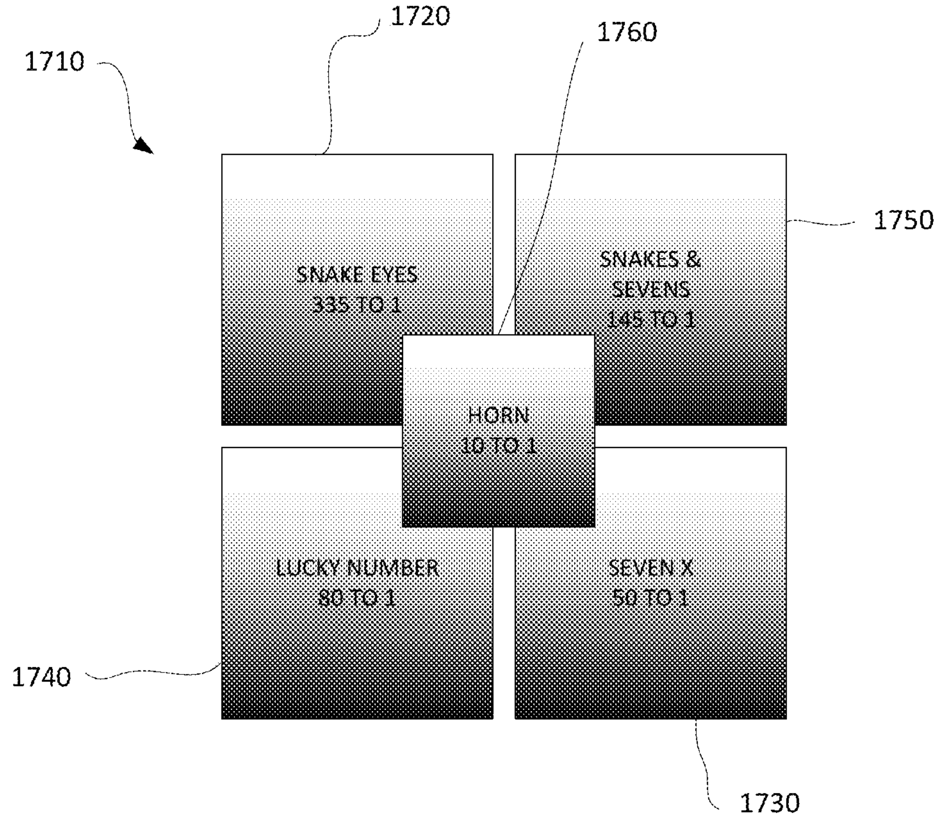
FIG. 17 illustrates an example of a roulette horn side bet in accordance with an embodiment.

In an embodiment, the player may play a roulette horn bet. A player may be able to select one of the roulette horn bets by simply selecting a button in the side bet area 1710 of GUI 1600, such as illustrated in FIG. 17. A roulette horn bet is different from a craps horn bet, which covers the three craps numbers 2, 3 and 12 as well as the number 11. In a craps horn bet, any sum bet is divided equally between all four numbers. If any of the numbers are rolled (the combination of the two dice), the rolled number wins and the other three lose.

A simple roulette horn bet may be 0/00, referred to as "Snake Eyes" 1720 in FIG. 17. If this bet is placed and one roulette machine result is "0" and the other is "00", then the bet is won, but if any other combination results, the bet is lost. The Snake Eyes bet has the highest payout of 335:1, but the lowest odds of being won. Other roulette horn bets may be referred to as "Sons of Seven" or "Seven X" 1730 with a payout of 50:1, which includes the numbers 7/14/21/28/35. If the player selects this bet and the combined result of both roulette machines is one of those numbers, such as "3" and "11", the player wins. If the combined result is any amount other than a 7, 14, 21, 28 or 35, the bet is lost.

A further roulette horn bet may be called "Lucky Number" 1740 with a payout of 80:1, which includes the numbers 2/6/8/9. If the player selects this bet and the combined result of both roulette machines is one of those numbers, such as "1" and "5", the player wins. If the combined result is any amount other than a 2, 6, 8 or 9, the bet is lost. Another roulette horn bet may be called "Snakes & Sevens" with a payout of 145:1, which includes the numbers 0/00/7. If the player selects this bet and the combined result of both roulette machines (in either order) is one of those numbers, meaning "0" & "0", "0" & "00", "00" & "00", "0" & "7", "00" & "7", "1" & "6", "2" & "5" or "3" & "4", the player wins. If the combined result is any amount other than a 2, 6, 8 or 9, the bet is lost.

Finally, the roulette horn bet may be any of the numbers included in the other roulette horn bets, which is referred to as a "Horn" 1760 bet, which has a payout of 10:1. If the player selects this bet and the combined result of both roulette machines is one of those numbers, the player wins. If the combined result is any amount other than a 0, 00, 2, 6, 7, 8, 9, 14, 21, 28 or 35 the bet is lost.

In an embodiment, the side bet may be a high/low bet, which may use either wheel to determine if the bet is won instead of combining the results of both wheels. For example, a payout of 7:1 may correspond to a low bet, where if the result of either roulette machine is 1-9 or 28-36, the bet is won, provided the other roulette machine result was not 0 or 00. A higher payout of 14:1 bet may correspond to a result of either roulette machine being 1-6 or 31-36, then the bet is won, provided the other roulette machine result was not 0 or 00. A higher payout of 40:1 bet correspond to a result of either roulette machine being 1-3 or 34-36, then the bet is won, provided the other roulette machine result was not 0 or 00. These ranges are just examples and other ranges may be used with correspondingly different payouts depending the probability of the numbers in the range resulting from the outcome of the roulette machine(s).

A variation of the high/low bet may be a high/low wild bet. In a lower payout example, with a payout of 16:1, a first roulette machine result may have to be between the numbers 1-9 and the second roulette machine result may have to be between the numbers 28-36. In other words, the roulette ball of the first machine may have to fall into a roulette wheel slot of either 1, 2, 3, 4, 5, 6, 7, 8, or 9 and the roulette ball of the second machine may have to fall into a roulette wheel slot of either 28, 29, 30, 31, 32, 33, 34, 35 or 36. A higher payout of 36:1 may include smaller ranges for both the low (of numbers 1-6) and high (of number 31-36). A highest payout of 1328:1 may require a first ball of the first roulette machine to drop in a slot that was randomly selected by a random number generator as either part of the play station or the roulette machine and may require a second ball of the second roulette machine to drop in a slot that was similarly randomly selected.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 18:
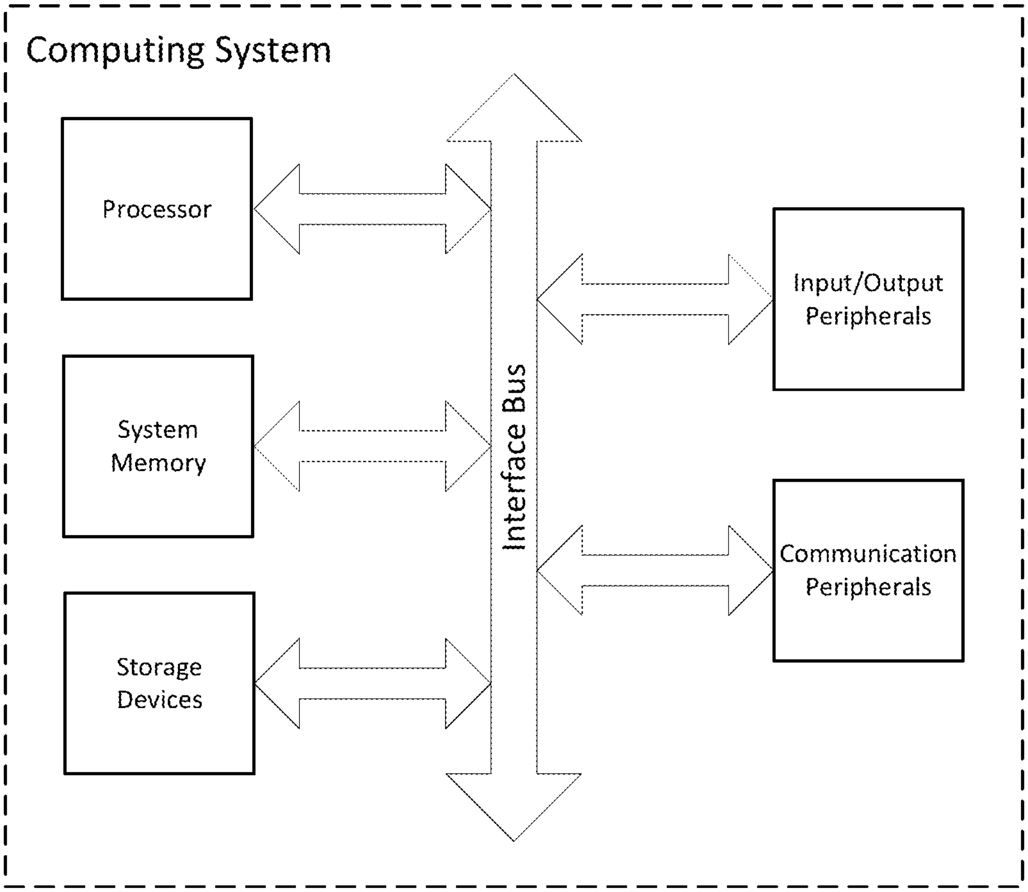
FIG. 18 is an illustration of an exemplary block diagram representing a general purpose computer system in which aspects of the methods and systems disclosed herein or portions thereof may be incorporated.

The techniques described above can be implemented on a computing device associated with a gaming device (e.g., a roulette machine operating a live roulette game), a plurality of computing devices associated with a plurality of gaming devices, a controller in communication with the gaming device(s) (e.g., a controller configured to synchronize the gaming devices(s)), or a plurality of controllers in communication with the gaming device(s). Additionally, the techniques may be distributed between the computing device(s) and the controller(s). FIG. 18 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. Instructions stored in the memory may be executed by the processor to perform a variety of methods and operations, including the roulette wheel velocity adjustments and result detection optimization, as described above. The computing system components may be present in the gaming device, in a server or other component of a network, or distributed between some combination of such devices.

The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may also include a variety of sensors, such as light, proximity, GPS, magnetic field, altitude, velocity/acceleration, RSSI, and distance sensors, as well as other types of sensors. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface and carry out other methods and operations that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WIFI/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

As previously noted, the various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, “can,” “could,” “might,” “may” “e.g.,” and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all of the elements in the list.

The present disclosure describes particular embodiments and their detailed construction and operation. The embodiments described herein are set forth by way of illustration only and not limitation. Those skilled in the art will recognize, in light of the teachings herein, that there may be a range of equivalents to the exemplary embodiments described herein. Most notably, other embodiments are possible, variations can be made to the embodiments described herein, and there may be equivalents to the components, parts, or steps that make up the described embodiments. For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

What is claimed is:

1. A method for operating roulette wheels, the method comprising:

launching a first roulette ball associated with a first game cycle on a first roulette wheel of a first roulette machine when a first launch condition is met;

monitoring inertial information associated with the first roulette ball moving on the first roulette wheel;

launching a second roulette ball associated with the first game cycle on a second roulette wheel of a second roulette machine in response to a side bet placed via an interactive user interface;

monitoring inertial information associated with the second roulette ball moving on the second roulette wheel;

adjusting one or more of a roulette wheel speed and roulette wheel braking of one or more of the first roulette machine and the second roulette machine in response to the monitoring of inertial information associated with the first roulette ball and the monitoring of inertial information associated with the second roulette ball such that a first game cycle result and a second game cycle result are generated substantially simultaneously; and in a second game cycle associated with the first roulette machine and the second roulette machine, adjusting, based on inertial information associated with one or more previous game cycles, one or more of a launch speed for a next roulette ball launched on the first roulette machine and a launch speed for a next roulette ball on the second roulette machine.

2. The method of claim 1, wherein the roulette wheel speed of one or more of the first roulette machine and the second roulette machine is adjusted by a randomized amount, wherein an outcome of the first game cycle is predicted before one or more of the first roulette ball and the second roulette ball come to a rest, and wherein the outcome is predicted based on the randomized amount, the monitoring of inertial information associated with the first roulette ball, and the monitoring of inertial information associated with the second roulette ball.

3. The method of claim 1, wherein adjusting one or more of a roulette wheel speed and roulette wheel braking of one or more of the first roulette machine and the second roulette machine cause the first game cycle and the second game cycle to conclude substantially simultaneously.

4. The method of claim 1, further comprising: synchronizing the launching of the first roulette ball and the launching of the second roulette ball to occur substantially simultaneously.

5. The method of claim 1, wherein the second game cycle is initiated at a specified time following the first game cycle result.

6. The method of claim 1, further comprising: generating, on an interactive user interface, a betting window comprising a bet close time, wherein the bet close time is determined based on the inertial information associated with at least one of the first roulette ball and inertial information associated with the second roulette ball.

7. The method of claim 6, wherein the bet close time precedes a time that one or more the first roulette ball and the second roulette ball exit an annular track associated, respectively, with the first roulette wheel and the second roulette wheel.

8. The method of claim 7, wherein adjusting the roulette wheel speed of one or more of the first roulette machine and the second roulette machine occurs subsequent to the bet close time.

9. The method of claim 1, wherein monitoring inertial information comprises capturing image data associated with at least one of the first roulette ball and the second roulette ball.

10. The method of claim 1, further comprising: generating an audio announcement corresponding to movement of one or more of the first roulette ball on the first roulette wheel and the second roulette ball on the second roulette wheel.

11. The method of claim 10, wherein the audio announcement corresponds to one or more of contact of the first roulette ball with an object altering a ball path of the first roulette ball on the first roulette wheel and a contact of the second roulette ball with an object altering a ball path of the second roulette ball on the second roulette wheel.

12. The method of claim 1, further comprising: generating a lighting effect corresponding to movement of one or more of the first roulette ball on the first roulette wheel and the second roulette ball on the second roulette wheel.

13. The method of claim 1, wherein adjusting one or more of the roulette wheel speed and roulette wheel braking of one or more of the first roulette machine and the second roulette causes alignment of at least one of a pocket containing the first roulette ball and a pocket containing the second roulette ball with a position detection sensor for determining a game cycle outcome.

14. The method of claim 1, wherein the first roulette machine and the second roulette machine operate in parallel.

15. A system for operating roulette wheels, comprising:
- a first roulette machine comprising a first roulette wheel, the first roulette wheel receiving a first roulette ball when a first launch condition is met;
- a second roulette machine comprising a second roulette wheel, the second roulette wheel receiving a second roulette ball in response to a side bet placed via an interactive user interface; and
- at least one computing device comprising a processor and a memory configured to:
  - monitor inertial information associated with the first roulette ball moving on the first roulette wheel;
  - monitor inertial information associated with the second roulette ball moving on the second roulette wheel;
  - adjust one or more of a roulette wheel speed and roulette wheel braking of one or more of the first roulette machine and the second roulette machine in response to the monitoring of inertial information associated with the first roulette ball and the monitoring of inertial information associated with the second roulette ball such that a first game cycle result and a second game cycle result are generated substantially simultaneously; and
- in a second game cycle associated with the first roulette machine and the second roulette machine, adjusting, based on inertial information associated with one or more previous game cycles, one or more of a launch speed for a next roulette ball launched on the first roulette machine and a launch speed for a next roulette ball on the second roulette machine.

16. The system of claim 15, wherein the at least one computing device is further configured to synchronize launching of the first roulette ball and the launching of the second roulette ball substantially simultaneously.

17. The system of claim 15, wherein the at least one computing device is further configured to generate, on an interactive user interface, a betting window comprising a bet close time, wherein the bet close time is determined based on the inertial information associated with at least one of the first roulette ball and inertial information associated with the second roulette ball.

18. A non-transitory computer-readable storage medium comprising instructions stored thereon, which when executed by a processor, cause a computing device to:
- launch a first roulette ball associated with a first game cycle on a first roulette wheel of a first roulette machine when a first launch condition is met;
- monitor inertial information associated with the first roulette ball moving on the first roulette wheel;
- launch a second roulette ball associated with the first game cycle on a second roulette wheel of a second roulette machine in response to a side bet placed via an interactive user interface;
- monitor inertial information associated with the second roulette ball moving on the second roulette wheel;
- adjust one or more of a roulette wheel speed and roulette wheel braking of one or more of the first roulette machine and the second roulette machine in response to the monitoring of inertial information associated with the first roulette ball and the monitoring of inertial information associated with the second roulette ball such that a first game cycle result and a second game cycle result are generated substantially simultaneously; and
- in a second game cycle associated with the first roulette machine and the second roulette machine, adjusting, based on inertial information associated with one or more previous game cycles, one or more of a launch speed for a next roulette ball launched on the first roulette machine and a launch speed for a next roulette ball on the second roulette machine.

19. The non-transitory computer-readable storage medium of claim 18, further comprising instructions, which when executed by a processor, cause a computing device to: generate, based on movement of one or more of the first roulette ball and the second roulette ball, at least one of: an audio announcement, a lighting effect on one or more of the first roulette wheel and the second roulette wheel, and one or more images on a user interface.

20. The non-transitory computer-readable storage medium of claim 18, further comprising: synchronizing the launching of the first roulette ball and the launching of the second roulette ball to occur substantially simultaneously.

* * * * *